US010884385B2

(12) United States Patent
Tepper et al.

(10) Patent No.: US 10,884,385 B2
(45) Date of Patent: Jan. 5, 2021

(54) REALIZATION OF ENERGY SAVINGS POTENTIAL THROUGH FEEDBACK

(71) Applicant: EnergyHub, Inc., Brooklyn, NY (US)

(72) Inventors: Michele Tepper, Brooklyn, NY (US); Seth Frader-Thompson, Brooklyn, NY (US); Matthew Johnson, Brooklyn, NY (US)

(73) Assignee: EnergyHub, Inc., Brooklyn, NY (US)

( * ) Notice: Subject to any disclaimer, the term of this patent is extended or adjusted under 35 U.S.C. 154(b) by 0 days.

(21) Appl. No.: 16/277,878

(22) Filed: Feb. 15, 2019

(65) Prior Publication Data

US 2019/0204797 A1    Jul. 4, 2019

Related U.S. Application Data

(63) Continuation of application No. 14/592,598, filed on Jan. 8, 2015, now Pat. No. 10,209,687, which is a continuation of application No. 13/486,430, filed on Jun. 1, 2012, now Pat. No. 8,954,201.

(60) Provisional application No. 61/493,322, filed on Jun. 3, 2011.

(51) Int. Cl.
G05B 15/02      (2006.01)
F24F 11/30      (2018.01)
F24F 11/62      (2018.01)

(52) U.S. Cl.
CPC .............. *G05B 15/02* (2013.01); *F24F 11/30* (2018.01); *F24F 11/62* (2018.01); *G05B 2219/2614* (2013.01); *Y02T 90/167* (2013.01); *Y04S 30/12* (2013.01); *Y10S 715/961* (2013.01)

(58) Field of Classification Search
None
See application file for complete search history.

(56) References Cited

U.S. PATENT DOCUMENTS

| 5,696,695 | A  | 12/1997 | Ehlers et al. |
| 5,917,719 | A  | 6/1999  | Hoffman et al. |
| 6,466,234 | B1 | 10/2002 | Pyle et al. |
| 7,252,013 | B2 | 8/2007  | Hammond, Jr. et al. |
| 7,252,014 | B1 | 8/2007  | Mayer et al. |
| 7,313,458 | B2 | 12/2007 | Itoh et al. |

(Continued)

OTHER PUBLICATIONS

Office Action for U.S. Appl. No. 13/486,430, dated Jul. 25, 2013.

(Continued)

*Primary Examiner* — Sean Shechtman
(74) *Attorney, Agent, or Firm* — Fish & Richardson P.C.

(57) ABSTRACT

Feedback is provided to a user based on a setting for a set of energy consuming devices. While a user modifies a thermostat's schedule or provides user commands to adjust a setting for the set of energy consuming devices, a user interface component generates feedback to the consumer in response to an adjusted setting based on a condition for a predetermined function. A positive feedback component generates a positive feedback, such as a positive image in the user interface if the setting meets or exceeds a recommended performance metric for an operational parameter for the set of energy consuming devices. A negative feedback component generates a negative feedback, such as a negative image if the setting meets or exceeds a second condition, such as a discouraged performance metric.

20 Claims, 10 Drawing Sheets

(56) References Cited

U.S. PATENT DOCUMENTS

| | | |
|---|---|---|
| 7,826,237 B2 | 11/2010 | Zhang et al. |
| 8,589,816 B2 | 11/2013 | Hofrichter et al. |
| 2003/0109938 A1 | 6/2003 | Daum et al. |
| 2004/0246512 A1 | 12/2004 | Miyamoto |
| 2005/0143865 A1 | 6/2005 | Gardner |
| 2007/0067651 A1 | 3/2007 | May |
| 2007/0236411 A1 | 10/2007 | Kurosaki et al. |
| 2007/0245258 A1 | 10/2007 | Ginggen et al. |
| 2008/0109473 A1 | 5/2008 | Dixon et al. |
| 2008/0306985 A1* | 12/2008 | Murray ............... G06Q 10/10 |
| 2009/0110427 A1 | 4/2009 | Ishizuka |
| 2009/0202250 A1 | 8/2009 | Dizechi et al. |
| 2009/0240380 A1 | 9/2009 | Shah et al. |
| 2010/0064257 A1 | 3/2010 | Buck et al. |
| 2010/0145787 A1 | 6/2010 | Ohman et al. |
| 2010/0235007 A1 | 9/2010 | Constien et al. |
| 2011/0046799 A1 | 2/2011 | Imes et al. |
| 2011/0046805 A1 | 2/2011 | Bedros et al. |
| 2011/0113120 A1 | 5/2011 | Johnson et al. |
| 2011/0307112 A1 | 12/2011 | Barrilleaux |
| 2011/0313579 A1 | 12/2011 | Ling |
| 2011/0320054 A1 | 12/2011 | Brzezowski |
| 2012/0029897 A1 | 2/2012 | Cherian et al. |
| 2012/0053740 A1 | 3/2012 | Venkatakrishnan et al. |

OTHER PUBLICATIONS

Office Action for U.S. Appl. No. 13/486,430, dated Nov. 29, 2013.
Office Action for U.S. Appl. No. 13/486,430, dated Feb. 13, 2014.
Office Action for U.S. Appl. No. 13/486,430, dated Jul. 25, 2014.

* cited by examiner

REALIZATION OF ENERGY SAVINGS POTENTIAL THROUGH FEEDBACK

CROSS-REFERENCE TO RELATED APPLICATIONS

The present application is a continuation of U.S. patent application Ser. No. 14/592,598, filed Jan. 8, 2015, now allowed, which is a continuation of U.S. patent application Ser. No. 13/486,430, filed Jun. 1, 2012, now U.S. Pat. No. 8,954,201, issued Feb. 10, 2015, which claims priority from U.S. Provisional Patent Application No. 61/493,322, entitled "SYSTEMS AND METHODS FOR ACHIEVING ENERGY SAVINGS POTENTIAL THROUGH FEEDBACK," filed on Jun. 3, 2011. The prior applications are hereby incorporated by reference in their entirety.

TECHNICAL FIELD

This application relates generally to efficient energy management, and to achieving energy savings potential through feedback.

BACKGROUND

Giving consumers hardware to lower their energy consumption alone is often not sufficient to produce the hardware's full energy savings potential. For example, the U.S. Environmental Protection Agency (EPA) has estimated that consumers could save approximately 20% on heating and cooling costs per year by properly programming their thermostats. However, a recent investigation revealed that most people with programmable thermostats never program them and that a third of respondents put their thermostats in a long-term hold. As a result, capable hardware (e.g., programmable thermostats) alone fails to deliver possible energy savings potential.

The above-described deficiencies of today's energy management systems are merely intended to provide an overview of some of the problems of conventional systems, and are not intended to be exhaustive. Other problems with the state of the art and corresponding aspects of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In one or more embodiments, a control system is disclosed comprising a memory that stores computer-executable components and a processor, communicatively coupled to the memory that facilitates execution of the computer-executable components. The computer-executable components include a user interface component configured to receive a selection of a set of user commands related to at least one setting of a set of energy consuming devices. A feedback component is configured to provide feedback in response to reception of the set of user commands or inputs related to the selection. In addition, the feedback component can determine whether the received set of user commands adjust the at least one setting to satisfy a pre-defined condition associated with the set of energy consuming devices. The feedback component, in response to a determination that an adjustment of the at least one setting based on the received set of user commands satisfies the pre-defined condition, generates feedback that includes an indication of a quality of an impact of the selection of the set of user commands determined based on the pre-defined condition having been satisfied, for render by the user interface component.

In another exemplary embodiment, an apparatus is disclosed that comprises a memory storing computer-executable components, and a processor that is communicatively coupled to the memory. The processor is configured to facilitate execution of the computer-executable components including a user interface component configured to receive a set of user commands related to at least one setting of a set of energy consuming devices, control operation of the set of energy consuming devices, and render feedback that is based on the set of user commands or inputs related to the at least one setting. A feedback component is configured to, in response to reception of the set of user commands, determine whether the received set of user commands adjust the at least one setting to satisfy a pre-defined condition associated with the set of energy consuming devices. The feedback component is further configured to, in response to a determination that an adjustment of the at least one setting based on the received set of user commands satisfies the pre-defined condition, generate feedback including an indication of a quality of an impact of the set of user commands determined based on the pre-defined condition having been satisfied, for render by the user interface component.

In yet another embodiment, a method is disclosed comprising receiving, by a device including at least one processor, a set of user commands to adjust at least one setting of a set of energy consuming devices. Feedback can be generated based on and related to a setting that is set by the set of user commands. In addition, a determination is made as to whether an adjustment of the at least one setting satisfies a pre-defined condition. Feedback is generated that includes an indication of a quality of an impact of the set of user commands. This indication can be determined based on the pre-defined condition having been satisfied, for render by an user interface component.

In another embodiment, a computer readable storage medium is disclosed comprising computer executable instructions that, in response to execution, cause a computing system including at least one processor to perform operations. The operations comprise receiving, by a device including at least one processor, a set of user commands to adjust at least one setting of a set of energy consuming devices, determining whether an adjustment of the at least one setting satisfies a pre-defined condition; and generating feedback including an indication of a quality of an impact of the set of user commands determined based on the pre-defined condition having been satisfied, for render by an user interface component.

In another embodiment, a system is disclosed comprising means for generating a user interface that provides a feedback image and an operational setting for a set of energy consuming devices; means for determining a determination based on whether a condition of a predetermined function is met based on the operational setting; wherein the means for generating the user interface generates the feedback image based on the determination.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

Figure 1:
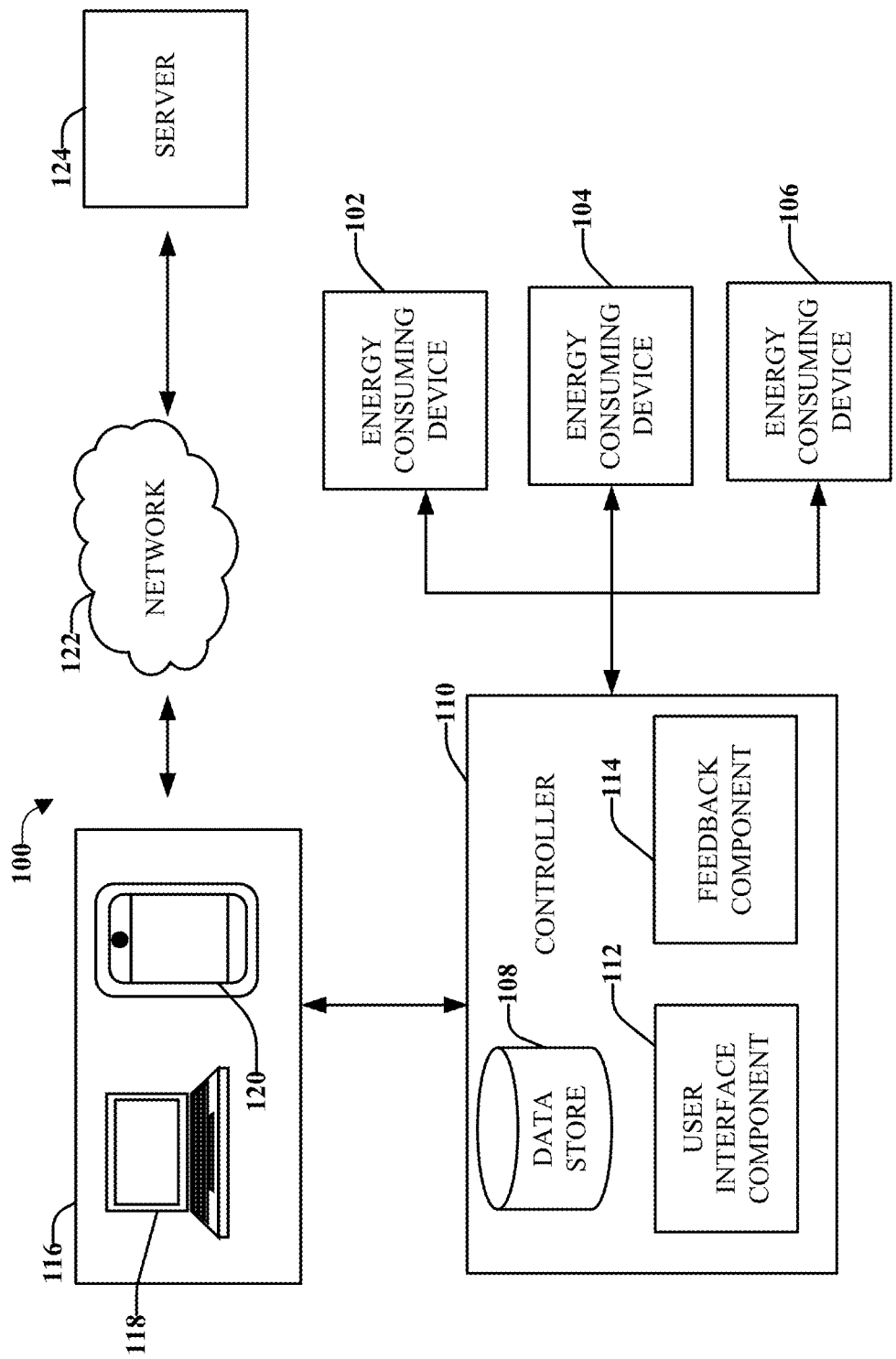
FIG. 1 illustrates an exemplary control system in accordance with various embodiments described.

Embodiments and examples are described below with reference to the drawings, wherein like reference numerals are used to refer to like elements throughout. In the following description, for purposes of explanation, numerous specific details in the form of examples are set forth in order to provide a thorough understanding of the various embodiments. It will be evident, however, that these specific details are not necessary to the practice of such embodiments. In other instances, well-known structures and devices are shown in block diagram form in order to facilitate description of the various embodiments.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon such as with a module, for example. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements. Additionally, the word "set" or "sub-set" is used herein to refer to one or more of a component or item in which the term modifies or refers to.

In one or more embodiments disclosed herein, a system and apparatus receive user commands to adjust one or more settings for energy consuming devices (e.g., an HVAC system, home appliances, and the like). In response to a setting being adjusted by the received user commands, feedback is generated that is associated with the setting to provide information about the setting. For example, information about the setting can be whether it is one that is recommended (e.g., Environmental Protection Agency (EPA) recommendation, a cost saving setting, a carbon emission cutting setting, and the like) as related to the energy consumption and/or costs of the home or a set of energy consuming devices of the home, in which a "set," as referred to in this disclosure, can mean "one or more."

A user is provided informational feedback (e.g., positive feedback and/or negative feedback) based on whether a setting satisfies a pre-defined condition including a first pre-defined condition and/or a second pre-defined condition. For example, in response to user commands modifying a setting to meet the first pre-defined condition a positive indicator, such as a checkmark, a green image, a sound, animation, haptic feedback or similar indicator associated with the setting is displayed or generated alongside or proximate to the setting. The indicator can be a positive indicator to indicate that a benefit is associated with the particular setting satisfying a designated performance metric, such as an EPA setting for ENERGY STAR Residential Climate Controls, for example.

Other performance metrics being met could trigger the generation of other feedback. For example, a setting that would incur cost for the home due to an efficient use of energy devices during the day while at work can cause a smokestack, a red image, an "X" or some other image or message to the user that the associated setting is not an efficient use of energy, generates greater costs or emission than necessary. For example, the feedback includes, but is not limited to an image, a sound, an animation, and/or a haptic feedback (e.g., a motion or touch sense related feedback).

As an overview, the various embodiments of energy consumption management herein include methods that can receive a set of user commands related to a set of energy consuming devices and generate in a user interface feedback related to the set of user commands. In response to the set of user commands initiating a setting to the set of energy consuming devices that meets a condition of a predetermined threshold, a user interface component generates feedback to inform the user whether a setting is beneficial or not beneficial.

An apparatus for receiving user commands and setting operational parameters of energy consuming devices of a home generates feedback to a user in a user interface. For example, the apparatus comprises a Programmable Communicating Thermostat (PCT), a Home Energy Manager (HEM), a demand response appliance, Heating, Ventilation and Air Conditioning (HVAC) unit and the like device that receives settings based on user commands. The apparatus (e.g., HEM) includes a user interface component that can control the settings of one or more energy consuming devices, such as dishwashers, clothes washers, dryers, HVAC systems, a pool pump, other appliances that have detectable power levels and the like. The apparatus includes a processor having executable instructions. A feedback component generates feedback in response to the settings being set by the user commands. For example, the feedback includes, but is not limited to an image, a sound, an animation, and/or a haptic feedback. The feedback, for example, can be displayed alongside or proximate to each setting in the user interface. Based on the feedback, the user is able to observe whether each of the settings satisfy a pre-defined condition, which can be an energy cost condition as configured based on a local utility company cost structure, an emissions condition such as $CO_2$ emission, a setting condition according to ENERGY STAR Residential Climate Controls, a comfort setting based on a desired level of comfort or a user preference related to the energy consuming device, a recommended setting for a particular energy consuming device, a time of day associated with each pre-defined condition, and the like based on a function (e.g., an operational function, cost, emission with respect to time or other variable). These embodiments and further embodiments are further detailed below.

Systems and Methods for Achieving Energy Savings Potential Through Feedback

In the following detailed description, reference will be made to the accompanying drawing(s), in which identical functional elements are designated with like numerals. The aforementioned accompanying drawings show by vary of illustration, and not by vary of limitation, specific embodiments and implementations consistent with principles of the present invention. These implementations are described in sufficient detail to enable those skilled in the art to practice the invention and it is to be understood other implementations may be utilized and that structural changes and/or substitutions of various elements may be made without departing from the scope and spirit of present invention. The following detailed description is, therefore, not to be construed in a limited sense. Additionally, the various embodiments of the disclosure as described may be implemented in the form of software running on a general purpose computer, in the form of specialized hardware, or combination of both software and hardware.

FIG. 1 schematically illustrates an exemplary system 100 that generates feedback to a user (e.g., an energy consumer) during creation or modification of energy management settings. The system 100 includes one or more energy consuming devices, such as devices 102, 104, 106. The energy consuming devices can be the same energy consuming devices and/or one or more different energy consuming devices, in which each of the energy consuming devices 102, 104, 106 can comprise one or more power consuming features/functions. For example, device 104 can be a refrigerator, an HVAC system, and/or any energy consuming device capable of having power consumption measured thereat. The devices may also be controllers, or other energy consuming devices other than appliances or in some cases on site electric generation (e.g., solar panel devices, geothermal devices, and the like) and/or energy storage devices (e.g., battery, capacitor, etc.).

The system 100 comprises a controller 110 for managing functions of the energy consuming devices 102, 104, and/or 106, such as power consumption within a household. The controller 110 can be operatively connected, for example, to each of the power consuming features/functions of the energy consuming devices 102, 104, and/or 106. The controller 110 can include a processor, which is programmed to selectively send signals to the energy consuming devices 102, 104, and/or 106 respectively in response to input signals or user commands received. The energy consuming devices 102, 104, and/or 106, in turn, are operable to manipulate a powering of the power consuming features/functions thereof in response to the signals from the controller 110.

The controller 110 is configured to communicate to, control and operate the devices 102, 104, and 106, which can comprise appliances and/or thermostat controllers (e.g., a programmable communicating thermostat) in one of a plurality of operating modes (e.g., a normal operating mode, an energy saving operating mode, cost saving mode, a deferral mode, etc.). In one embodiment, the controller 110 operates in response to user commands that are received for controlling the various devices 102, 104, and 106. User commands or inputs can alter a setting for a power consuming feature or function of the energy consuming devices 102, 104, and 106. Upon receiving a user command, the controller 110 can communicate a signaled setting to alter a function of one or more of the energy consuming devices 102, 104, and 106, such as power consumption.

In another embodiment, the controller 110 indicates that a recommended setting or commands has been entered by generating feedback in response to the entered command. The controller 110, for example, comprises a data store 108, a user interface component 112 and a feedback component 114 that is communicatively coupled thereto. The user interface component 112 is configured to display feedback and to receive a set of user commands related to one or more settings of the energy consuming devices 102, 104, and 106. For example, the user interface component 112 can receive user commands or inputs directed to settings from a control panel or user interface controls (e.g., touch screen controls, external control mechanisms, etc.). The user interface component 112 can operate a display (not shown) and control buttons (not shown) for making various operational selections, which both of which are further detailed infra. For example, the display can be configured to provide active, real-time feedback to the user on the cost of operating each energy consuming device 102, 104, and 106, in which the costs can be based on the current operating and usage patterns and energy consumption costs, such as the cost per kilowatt-hour charged by a corresponding energy provider. In response to the user commands received, the user interface component 112 operates in conjunction with and is communicatively coupled to the feedback component 114.

The feedback component 114 is configured to generate feedback to a user via the user interface component 112 in response to receiving a set of user commands or a selection of the set of user command as input. For example, feedback is generated based in part on the received set of user commands adjusting the at least one setting to meet a pre-defined condition. The condition, for example, can be based on a recommended setting, a cost function, an emissions function, a power output, a comfort level or range, a termination schedule, other schedule with respect to time, an energy efficiency, instantaneous power consumption, aggregate power consumption for a time period, a demand response or peak time schedule and any other programmed user preference/setting for operating any of the energy consuming devices 102, 104, and 106 of a home or other powered building structure.

In response to reception of the set of user commands, the feedback component 114 determines whether the received set of user commands adjust a setting of the energy consuming devices 102, 104, and 106 to satisfy the pre-defined condition discussed herein. Based on the determination made, feedback is generated that includes an indication of a quality of an impact of the selection of the set of user commands based on the pre-defined condition having been satisfied. The feedback is rendered then via the user interface component 112.

For example, the feedback component 114 is configured to generate feedback, such as a positive or negative feedback, (e.g., an image, sound, animation, haptic feedback or other feedback data) that indicates a quality of an impact of the selection of user commands toward a pre-defined characteristic of the system, such as a pre-defined positive characteristic of the system 100. For example a pre-defined characteristic can be energy efficiency, in which a pre-defined positive characteristic can be an increase of energy efficiency, a decrease in instantaneous power consumption, a decrease in aggregate power consumption for a certain time period, a decrease in operating cost, avoiding a peak demand or demand response schedule from a utility costing more or resulting from additional generators during a peak time, and the like, for example. In one example, a checkmark or other image is rendered proximate or alongside the setting entered by a user commands that satisfies a recommended EPA setting.

Further, the feedback component 114 is configured to generate negative feedback, such as an "X", image or other data indicate the quality of the impact of the selection to be a decrease of the pre-defined positive characteristic of the system with energy consuming devices based on the pre-defined condition being satisfied or a pre-defined negative characteristic, which is opposite of the positive defined characteristic discussed above (e.g., decrease of energy efficiency, increase in instantaneous power consumption, increase in aggregate power consumption for a certain time period, increase in operating cost, consuming energy during a peak demand or demand response schedule from a utility costing more or resulting from additional generators during a peak time, and the like). For example, when cost increases past a certain point for a particular setting, the setting is contrary to an EPA recommended setting, satisfies a discouraged setting that incurs a greater detriment via cost, efficiency, energy consumption, etc, then the feedback component 114 can generate feedback (e.g., an image, animation, sound, haptic feedback, etc.) indicating that the quality of the setting is not good and is discouraged.

In one embodiment, the image can reflect a quality, such as a positive image for a positive impact on the system of energy consuming devices or a negative image for a negative impact. In addition, the image could reflect the type of impact, whether environmental, cost, comfort, etc. based on the pre-defined condition being satisfied associated with the setting, in which different settings can have feedback based on different pre-defined conditions for different functions and/or different energy consuming devices.

In addition, the controller 110 can be configured with default settings that govern normal modes of operation, energy savings mode operation, and/or other modes. Such settings in each mode can be fixed, while others are adjustable to user preferences, which could provide response to load shedding signals from a utility or energy provider. The user interface component 112 is further configured, for example, to provide optimal settings or optimal schedules for settings that are fixed or predetermined and operate in response to a user command to execute any one of a set of predetermined schedules, which is further detailed below.

In other embodiments, the controller 110 is operable to transmit signals received from a utility (via smart meter or other means) along to devices 102, 104, and 106 connected to a home area network (HAN) or some other network, for example. The controller 110 can manage which devices shed load by entering into an energy savings mode or other power deferred state and collects home data about the home in a home database of a memory or data store 108, for example. The data can be further stored into an aggregate home database, such as the data store 108 having home data from multiple homes. The home data can be collected and stored in the controller's memory 108 on-site via a query for public home data or from a private database of home data for homes sharing such information.

The controller 110 is configured to gather information and data related to current energy usage patterns, energy generation and/or storage data. A carbon footprint can be calculated together with an energy profile of the home based on the characteristics of the utility generation mix and other fuels (such as natural gas) consumed by the home. This information can be used to determine current energy usage and cost associated with using each device/appliance as well as provide information with a web browser of suppliers able to provide energy reduction devices, information to save on energy usage, increase generation at the home, improve storage, and/or other savings tips for the home including recommendations for making changes to the home based on demographic information and home data, as well as other recommendations. This real-time information (i.e., current usage patterns, and/or current power cost) can be presented to the user via the user interface component.

Home data is merged together by the device controller 110 acting as the central brain for the system and includes information about construction specifications, such as geographical location, home age, size, insulation information, appliances within the home, a number of rooms, an orientation of the home obtained from a mapping database, for example, and/or other public and/or private residence data pertaining to the home. Private residence data includes past utility bills, HVAC/appliance data, size, ratings, home expansion data, window orientation, number of floors, number of residents, and/or any other type of private data related to energy usage of the home. Other data affecting the home stored in a home data base includes meteorological data, such as temperature, solar insolation data, precipitation, geographical weather, wind patterns, and/or the like, for example. Utility data pertaining to the home is also considered as home data gathered by the controller 110. Utility data includes information about usage/cost history, the generation of $CO_2$ by the utility generation mix or other emissions caused by the home, and/or data for similar residences having data available for comparison.

In one embodiment, the system can comprise a server component with a web based application interface that presents all home data including current energy consumption, historical energy consumption, thermostat set points and schedule (e.g., vacation schedule, day, week, month schedules, schedules based on season, and other schedules with respect to time or utility demand schedules), weather forecast information for determining optimal times to run certain devices, generate energy on-site, and/or store energy to the energy consumer/user of the home.

In one embodiment, the central controller 110 operates as a data server embodied in a client application (not shown). The central controller 110 provides data received from devices within the home to the client application, which in turns formats the data to be presented to the user, such as in graphs or other type of displays. In another embodiment, the controller 110 operates as a web server for serving web based applications to a browser device and/or a sending interface over an IP connection for a web based application.

In another embodiment, the controller 110 connects via either Ethernet or Wi-Fi to the homeowner's router and to a client application 116 in a personal computer 118 and/or a mobile device 120 to access a network 122, such as a cloud network or a wide area network (e.g., an Internet). This allows for remote service and monitoring capability. A server 124 can keep records of all homes therein that may be accessed remotely via the network 122.

In one embodiment, the central controller 110 compiles an energy profile and carbon footprint, such as graphs from home data stored within the home data store 108 for a home. The data store 108 can be operable to be updated via the user interface component 112 with demographic information regarding the number, age, sex, and income of the residents as well as information about the occupancy patterns, and other personal preferences related to the home. A carbon footprint is the total set of greenhouse gases (GHG) emissions associated with activities of an organization, event or product. For simplicity of reporting, it is often expressed in terms of the amount of carbon dioxide, or its equivalent of other GHGs, emitted. An individual, nation, or organization's carbon footprint can be measured by undertaking a GHG emissions assessment. Once the size of a carbon footprint is known, a strategy can be devised to reduce it, e.g. by technological developments, better process and product management, changed Green Public or Private Procurement (GPP), carbon capture, consumption strategies, and others. The mitigation of carbon footprints through the development of alternative projects, such as solar or wind energy or reforestation, represents one way of reducing a carbon footprint and is often known as carbon offsetting.

The energy profile of the home can be based on home data, such as physical and demographic data about the individual's home and/or the carbon footprint. For example, home data comprises data such as a geographical location, as determined by GPS, for example, size (e.g., square footage), number of floors/rooms, age/year of construction, and an orientation of the home as provided by a mapping application, on-site generation data and/or other public/private residence data. Home data further includes meteorological data including local temperatures, precipitation, solar insolation data, and wind trends. Utility data is also compiled, such as historical energy consumption and cost history information, emissions of carbon dioxide by the utility generation mix or other emission data for the given home, and usage for homes that are similar based on similar construction age, size, orientation and/or other physical and demographic data about the home.

The individual home data is compiled into an aggregate home database for multiple homes for a comparison to be made with the consumer's individual home and other similar type homes. The comparison results are presented to the user in a web browser or a client application 116, for example, on a client device. The aggregate home database could be stored on-site in the memory controller and/or the server 124. The comparison results of similar homes are used to make recommendations to the consumer of the home for saving energy costs and/or reducing the carbon footprint. The recommendations include cost savings, payback benefits, financing options, local supplier information, on-site generation methods and/or devices for reducing cost, carbon, and/or other emission associated with energy usage at the home. For example, products/services for reducing energy costs/$CO_2$ emissions can be provided, such as upgraded appliances suggestions, hot water and/or lighting upgrades. Other examples include HVAC upgrades or repairs, geothermal, solar thermal methods, on site generation methods, such as photovoltaic solar panels, wind, natural gas, fuel cell options, etc. that are available online or locally. Improvements such as building shell improvements are recommended. For example, insulation types, windows, and other physical construction upgrade possibilities that may be of benefit to the consumer. Energy storage systems are presented that comprise battery, hot water or cold storage methods. Energy audit services are also suggested for the local area for improving cost, efficiency, and/or carbon offsetting.

Recommendations are provided for reducing overall net energy consumption and approaching a net zero energy condition. The evaluation would include recommendations regarding energy reduction and addition of on-site power generation and/or storage at the home. The recommendations are based on at least one of the comparison of similar type homes, age, geographical location, cost, home construction efficiency, resident demographic data, past utility billing information, total power/energy consumption of the home, power/energy consumption of individual energy consuming devices at the home, generation produces available, and/or storage products available. A net zero energy consumption is when a home has a source of in-home generation or storage and generates as much energy at the home as is consumed over the course of a time period, such as a year. For example, recommendations provided to the homeowner could provide the energy usage amounts over time to the user with in-home/on-site generation data. If in-home generation data (e.g., solar generation or other on-site home generation amount) is less than the amount consumed by the set of energy consuming devices, options available will be provided to improve any number of the characteristics making up the home's profile to increase efficiency, cost and/or generation of energy. For example, age of the home may indicate that new windows could be provided by a certain local supplier suggested that would increase insulation by an amount to offset cost and the carbon footprint made by the home. Other products/services/suppliers could be provided that are available to the user, such as newly marketed flexible solar panels, or increased efficiency solar panels, geothermal devices, on-site fuel cells, windmills, etc.

Figure 2:
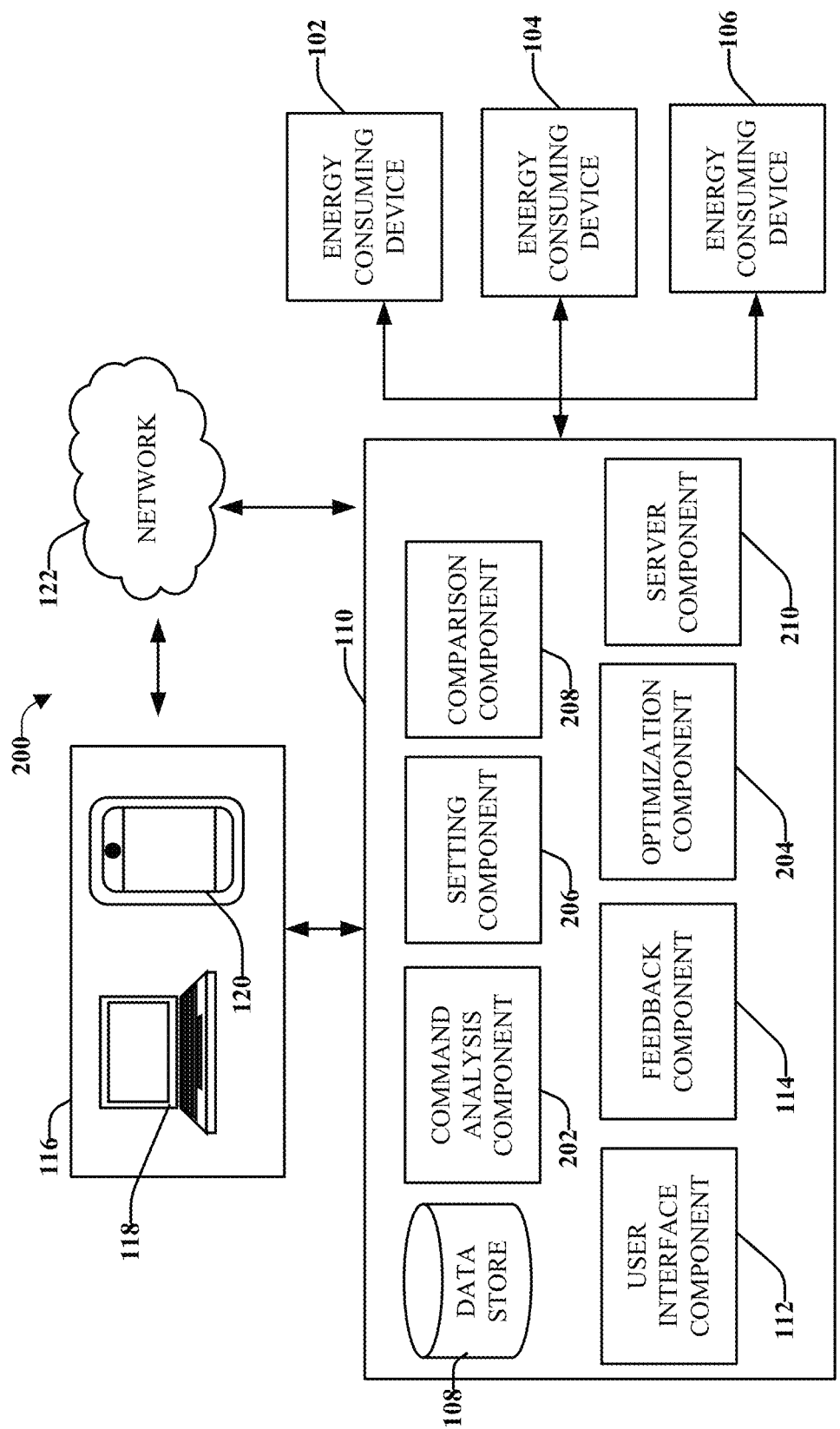
FIG. 2 illustrates aspects of another exemplary control system in accordance with various embodiments described.

Referring now to FIG. 2, illustrated is an exemplary control system 200 for receiving user commands for initiating operational settings and generating feedback in response to the received user commands or initiated operational settings. The set of energy consuming devices 102, 104, and 106 can include, for example, a refrigerator, an HVAC system, a demand response appliance configured to manage power consumption by responding to communication commands, a dishwasher, a dryer, a washer, an electric vehicle charger and/or any other energy consuming device configured to operate at detectable power levels for a building structure or a home. Additionally, the controller 110 can comprise a programmable communicating thermostat, a home energy manager, a mobile device, a website server, and/or other device that controls, stores, and/or communicates operational data or home data related to the set of energy consuming devices 102, 104, and 106. The controller 110 includes a command analysis component 202, an optimization component 204, a setting component 206 and a comparison component 208 that operate to generate feedback to a user or consumer. For example, the command analysis component 202 is configured to analyze a set of user commands received by the controller 110 via the user interface component 112, and generate an analysis of the received set of user commands with respect to a change from a first operational setting to a second operational setting of the set of energy consuming devices, and display the analysis to the user via the user interface component 112. The feedback can include at least one of cost change and energy consumption change feedback related to the adjustment of the at least one setting. The calculations of the changes can be based on a thermodynamic model of a home or of the set of energy consuming devices. Alternatively, the calculations for the feedback can fall to averages and heuristics when detailed data is not available as related to the set of energy consuming devices.

For example, the controller 110 can operate as a thermostat unit that can receive a set of user commands to adjust an HVAC unit to heat and/or cool a home with an air pump and a heating component (not shown). The controller 110 could receive a set of user commands from a homeowner, user or consumer that can initiate operational settings for the HVAC unit. The settings can include multiple settings for different times of a day, different days, different dates with respect to occupancy of the home, with respect to timeframe, or with respect to cost, pollutant emissions, demand response scheduling from the utility and the like. Upon receiving user command to modify, alter or otherwise change a setting of the HVAC unit or any other energy consuming device, the command analysis component could generate home data related to the energy consumption of the energy consuming devices and present the data to the user via the user interface component. The data, for example, can include a cost of adjusting a setting, such as temperature, from one temperature to a different temperature. The user thus stays informed and is able to make informed decisions as to whether to enter the setting to take effect in the operation of the HVAC unit.

In response to the user entering a setting with a set of user commands, the feedback component 114 generates feedback in the form of negative feedback or positive feedback to a user via the user interface component 112. For example, in response to a user setting a temperature, in the case of the HVAC unit example, or some other setting at a recommended setting, the feedback component generates a positive image, such as a checkmark, a leaf, a healthy heart and/or some other image to indicate a benefit (e.g., comfort, health, environmental, cost and/or some other benefit). In one aspect, the image is generated proximate to the setting displayed via the user interface component, and thus, complements or supplements the setting chosen. The settings can operate to control any number of performance metrics (e.g., energy consumption) of an energy consuming devices or any of the features associated therewith (e.g., fan control, pump speed, flow control, temperature fluctuation, mechanical movement, electrical generation, etc.).

In one embodiment, feedback is displayed or generated in conjunction with the user command being received, or the inputted commands being entered and/or stored. Various feedback images and/or feedback data (e.g., sound, animation, haptic feedback, etc.) is generated to complement the entered settings, as discussed above, in addition to negative images that can discourage a home owner from permanently or temporarily entering certain user settings based on a discouraged/detriment recommendation or condition. For example, in cases where high emissions could result from a hot day and/or at a high demand time for electricity, such as when reserve plants are provided in-line for additional generation, feedback could be provided in real time to a display that illustrates a negative benefit or a detriment to the user. For example, a cloud, a sad face, an "X" and/or some other image could be generated proximate to the entered user commanded setting in the display, which could indicate that a detriment can incur with respect to time when the setting is left at a particular performance metric for operating any one of the energy consuming devices 102, 104, and 106. The discouraged/detriment setting could be determined as a predetermined function of energy usage, cost, time, energy consumption amount, emissions, output, runtime, etc. In one example, when the consumer's settings achieve (meeting, exceeding, falling below) a designated performance metric, such as the Environmental Protection Agency's settings for ENERGY STAR Residential Climate Controls, a positive feedback image could be generated, such as a star, checkmark or the like. Further, a negative image could be generated in response to a setting that does not achieve the condition or, in other words, the designated performance metric. As a result, the feedback component 114 generates feedback to a user of the controller 110 via the user feedback component 112 in response to a pre-defined condition being satisfied (equaling, exceeding, or falling below) based on a predetermined function with respect to time, cost, emissions, and/or other variable and/or a pre-defined positive characteristic, such as cost, energy consumption, emissions output, runtime, etc. The optimization component 204 is configured to adjust a setting based on a set of predetermined operational programmed settings with predetermined schedules, settings, and the like that meet or exceed the pre-defined condition discussed above. The condition, for example, can be a condition based on a recommended setting, a cost function, an emissions function, a power output, a comfort level or range, a termination schedule, other schedule with respect to time and any other programmed user preference/setting for operating any of the energy consuming devices 102, 104, and 106 of a home or other powered building structure. In addition, the pre-defined condition can reflect a quality of an impact of a selection for a setting of the user commands. For example, the selected setting can be an increase of a pre-defined positive characteristic of the system (e.g., energy efficiency, power consumption, cost, etc), in which the pre-defined condition is determined to be satisfied based on the increased setting. Alternatively or additionally, a decrease can be evaluated based on the quality of the impact on the pre-defined positive characteristic.

The processor or controller 110 via the optimization component 204 further facilitates adjusting at least one setting based on a set of predetermined operational programmed settings that meet or exceed the pre-defined condition and in response to a user selection for the set of predetermined operational programmed settings. For example, an optimized command could be received that enables a user to select a set of predetermined operation programmed settings that modify the set of energy consuming devices towards a net zero energy consumption and accounts for the pre-defined condition including recommended settings for the set of energy consuming devices. In one example, the controller 110 can modify the set of energy consuming devices based in part on a set of user preferences including at least one of energy savings, costs, time, and date. An optimization command can further enable all of these preferences to be applied automatically with a single user input command.

In one aspect, a user input, such as a single click or a single input operates to set one or multiple settings of the controller to operate the set of energy consuming devices 102, 104, and 106 at an optimal performance metric or at various performance metrics as recommended by the feedback component 114 and/or based on the feedback generated by the feedback component 114. For example, in cases where the feedback is generated as a negative image, an optimal input control generated by the user interface component could be set by a single user input command or multiple user input commands to ensure that a programmed schedule of predetermined operational settings is maintained.

Additionally, an optimal input or user input command can generate multiple settings for multiple energy consuming devices (e.g., HVAC, pool pump, garden hose timers, coffee makers, other home appliances, etc.) that are all set based on various schedules of occupants of a home, and to conserve energy, cost, emissions, and/or ensure safety while away from fire, flooding, shock, and any other hazard.

In addition, the controller 110 can be configured with default settings that govern normal modes of operation, energy savings mode operation, and/or other modes, which can be programmed by a user or predetermined for user selection. The user interface component 112 is further configured, for example, to provide optimal settings or optimal schedules for settings that are fixed or predetermined and operate in response to a user command (e.g., an optimal input command) to execute any one of a set of predetermined schedules as discussed.

The setting component 206 is configured to set and display the settings of the energy consuming devices, such as operational settings related to energy consumption or features of the devices that consume additional energy as measured by a meter or other sensor device (not shown). In response to reception of a set of user commands via the user interface component 112, the setting component 206 is configured to adjust the setting of the energy consuming devices 102, 104, and 106 so that each device having a modified or adjusted setting operates at the particular operational setting. For example, a signal can be generated informing the devices 102, 104, and 106 to operate at a different level or a signal directly controlling any of the energy consuming devices 102, 104, and 106 can be generated, such as with a regulator circuit or the like.

The comparison component 208 is configured to receive home data related to the set of energy consuming devices 102, 104, and 106 of a home, and generate a comparison of the home data with home data of homes that are similar or meet a predetermined set of criteria, such as similar size, construction specifications (e.g., age, number of rooms, etc.), for example, and/or other criteria that match the home data of the home for the set of energy consuming devices 102, 104, and 106. The comparison component 208 is further configured to display the comparison via the user interface component.

In one embodiment, the comparison component 208 is operable to generate a one-time message, a periodic message or message delivered at different intervals to the user with the comparison data of similar homes. For example, a periodic email, text, or interface display can be generated to provide a user data from similar homes having similar construction, and/or that are within a certain geographical radius of the home with the set of energy consuming devices 102, 104, and 106. The comparison component 208 can operate with a server component 210, for example, to generate an electronic message via a web browser or email client to the user with an energy profile of the set of energy consuming devices, the comparison data, cost saving recommendations, carbon dioxide $CO_2$ emission data on each energy consuming device, on-site power generation data, on-site storage data (e.g., type and capacity levels of charge), and other information, such as safety tips for improving energy awareness of the user's home.

Electronic messages can be sent by the controller or processor 110 and/or the server component 210 to the client application 116 and/or to the network 122 for access by a user of the device. In one embodiment, the user can control settings remotely via the device 118 and/or 120 and concurrently be provided the feedback from the feedback component 114 thereat. A user can therefore continue to stay informed of the state of a setting and how it impacts the pre-defined conditions discussed herein. In another embodiment, the pre-defined conditions are set by the user, updated via the network 122, or some other data source based on the user's preferences. In addition, the feedback, such as associated images and the like can also be altered similarly to the conditions for feedback.

Figure 3:
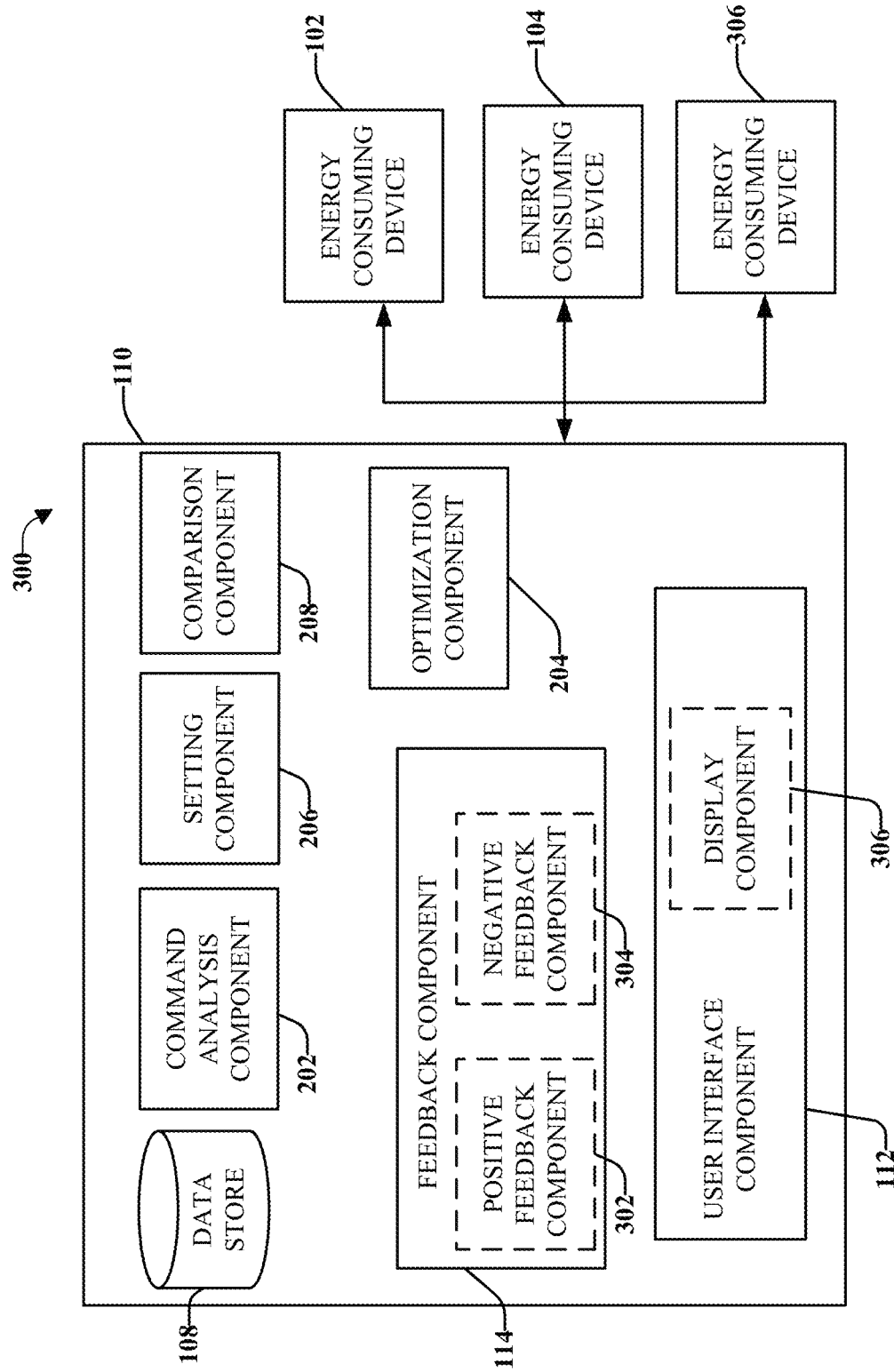
FIG. 3 illustrates further aspects of an exemplary system in accordance with various embodiments described.

Referring now to FIG. 3, illustrated is an exemplary control system 300 having the controller 110 (e.g., a processor) for controlling feedback related to user commands for a set of energy consuming devices of a home. The feedback component 114 includes a positive feedback component 302 and a negative feedback component 304 in order to generate feedback in response to an adjustment or setting of an operational setting for the set of energy consuming devices 102, 104, and 106. The feedback is generated based in part on user commands that adjust at least one setting to satisfy a pre-defined condition (e.g., satisfying at least one of a set cost, a recommended setting, a detrimental or discouraged setting, a set power operation of a coupled device, other performance metric, and/or other operational parameter).

In response to reception of the set of user commands, the feedback component 114 is configured to determine whether the received set of user commands adjust or the current setting satisfies a pre-defined condition associated with the set of energy consuming devices. The pre-defined condition, for example, can be an operational parameter of one or more of the energy consuming devices 102, 104, and 106, such as a temperature or climate control in the case of an HVAC unit of a home. Further, in response to a determination that an adjustment of the at least one setting is based on the received set of user commands satisfies the pre-defined condition, the feedback component 114 generates feedback with the positive feedback component 302 and/or the negative feedback component 304. The feedback provides an indication of a quality of an impact of the selection of the set of user commands based on the pre-defined condition having been satisfied, which is rendered by the user interface component 112 in a display, view pane or screen of the display component 306.

The positive feedback component 302 generate a positive feedback indicating the quality of the impact of the selection to be an increase of a pre-defined positive characteristic of the control system based on the pre-defined condition being satisfied. The positive characteristic can be an operational parameter and/or a performance metric, for example, that characterizes energy efficiency, instantaneous power consumption, aggregate power consumption with respect to a time period, operational cost, peak demand periods, vacation time, date, weather, and the like. The pre-defined condition can also be related to each of these examples, such as a recommended EPA climate setting, or some other set limit. Upon meeting or exceeding the pre-defined condition, feedback can be generated as a checkmark to signal that an EPA recommendation setting has been satisfied for a particular a setting category. For example, a time away setting may be recommended as a pre-defined condition to be below 55 degrees Fahrenheit, but above 50 degrees Fahrenheit to keep pipes from freezing, but to preserve cost efficiency in relation to the time for increasing the climate temperature of a home for returning home, especially near the return home time entered.

Similar to the positive feedback component 302, the negative feedback component 304 generates feedback that indicates the quality of a user command/setting selection of the system based on the pre-defined condition being satisfied. The pre-defined condition can be a second different condition than the condition of the positive feedback component and is pre-defined based on similar characteristics as discussed above, except that the feedback of the negative feedback component 304 results from the selection being a decrease of the pre-defined positive characteristic of the system (e.g., an operational parameter and the like).

The pre-defined condition includes the received set of user commands meeting or exceeding a performance metric of an operation parameter related to operation of at least one of the set of energy consuming devices. The feedback includes at least one of a positive image associated with the received set of user commands and a negative image associated with the received set of user commands satisfying the pre-defined condition as determined by the positive feedback component 302 and the negative feedback component 304.

The setting component 206 adjusts and displays the at least one setting of the set of energy consuming devices in conjunction with the user interface component 112 in a display component 306 (e.g., a display screen). The feedback (e.g., a leaf, checkmark, heart, cloud, X, etc.) can be displayed next to the setting of a particular category or of the set of user commands to select from, as well as alongside home data and/or cost analysis data related to the new setting. The display can also include comparison data of the new setting with the old setting (e.g., cost differentiation) or other home data of similar homes based on similar criteria or some predetermined criteria.

Figure 4:
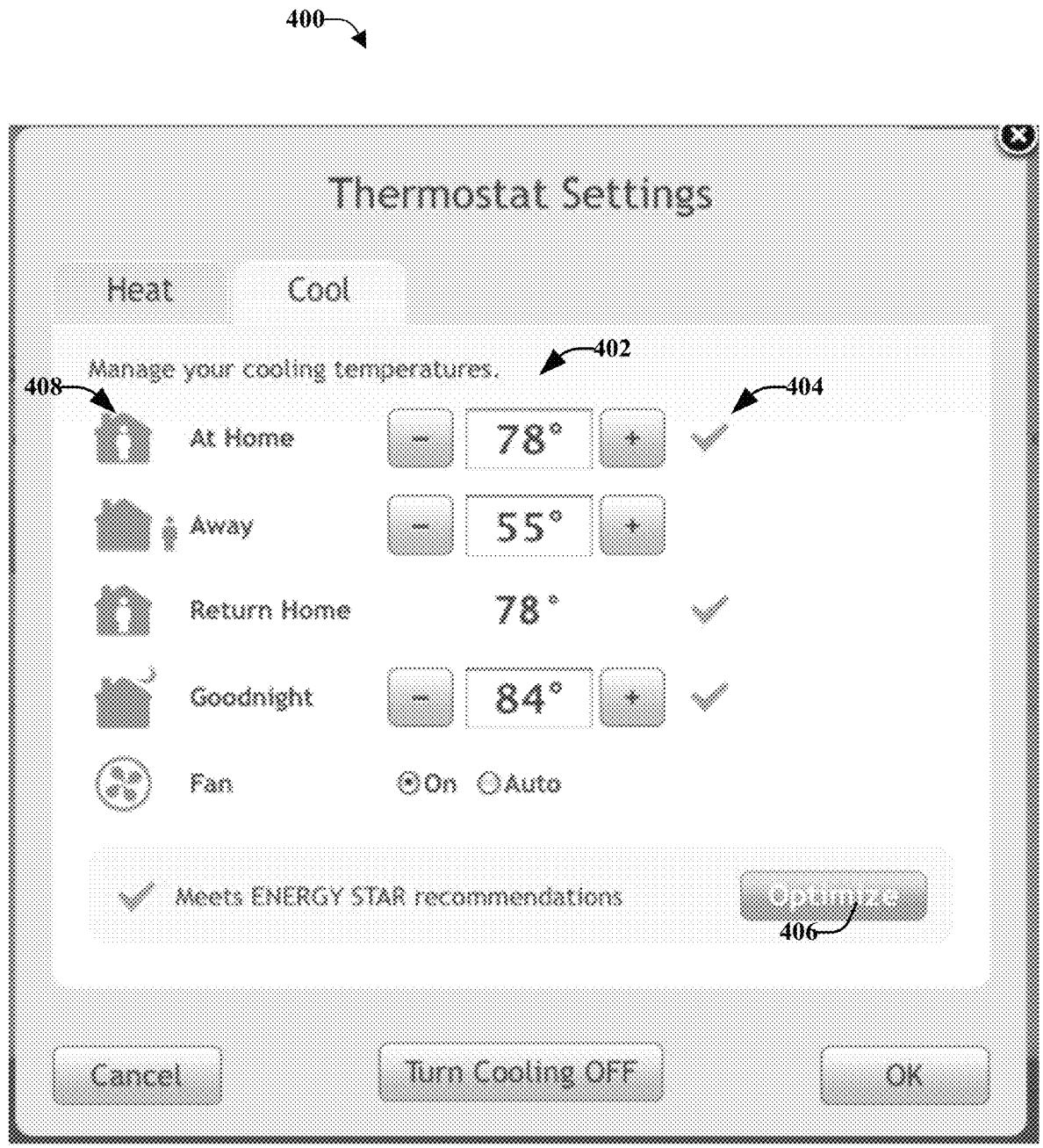
FIG. 4 illustrates an exemplary view pane in accordance with various embodiments described.

Referring now to FIG. 4, illustrated is a view pane or interface in accordance with various aspects discussed herein. A setting 402 of a set of settings is illustrated next to a corresponding category of the set of categories 408. A feedback 404 is generated and presented alongside or proximate to the setting 402. The feedback can include, for example, at least one of cost and energy consumption change feedback in response to the adjustment of the at least one setting.

Although temperature settings are displayed, the settings are not confined only to a temperature setting as discussed above. A checkmark indicates that a setting satisfies a pre-defined condition that includes a particular ENERGY STAR recommendation, for example. Other images that can correspond to other settings and categories can also be generated to indicate to a user a quality of an impact for the setting on a positive characteristic such as an operational characteristic, environmental characteristic, and/or cost benefit. Additionally, a negative feedback image can be generated to indicate that a different condition falls below or is satisfied as being a detriment or a discouraged setting. For example, an away setting could be below an acceptable or unsafe level for pipes freezing, for a furnace pilot light or some other negative impact to the user, or the environment.

An optimize input or command 406 enables a single user input (e.g., a click, tap, or any other input) to be generated by a user to set a set of settings for all or a few of the various categories. For example, each of the settings for each category could be predefined in a schedule that is initiated by the optimization component 204. These schedules may be user programmed or pre-determined based on the pre-defined condition for generating feedback images on the display. For example, the optimize input 406, upon being initiated can set all categories 408 to meet or satisfy the ENERGY STAR recommendations.

Figure 5:
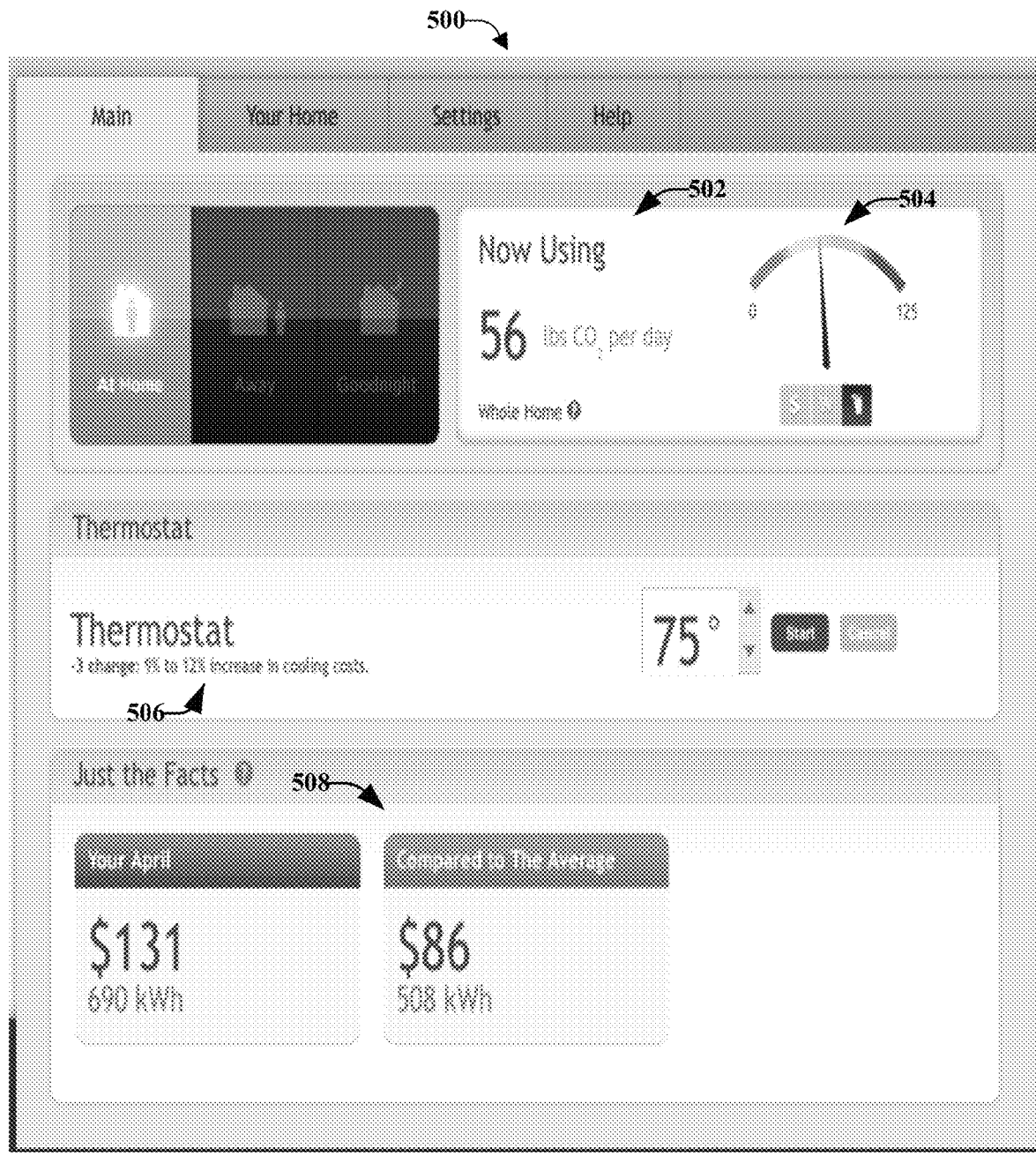
FIG. 5 illustrates an exemplary view pane in accordance with various embodiments described.

Referring now to FIG. 5, illustrated is another view pane or interface in accordance with various aspects discussed herein. A view pane 502 presents emissions data based on the set of energy consuming devices of the home. For example, $CO_2$ data is provided with a meter 504 that gives feedback as to the condition of the emissions. Other feedback can be provided as well in the view pane 502 that is related to at home, away or other periods of time (e.g., a night time, vacation time, etc.) feedback, in which these options can be indicated by a specific color (e.g., red) or brightness to indicate a selection of data related to one of the options. In addition, the meter 504 can provide feedback related to the emissions for a setting that is operating during a period of time (e.g., an at home time). For example, a red on the meter can indicate a high emissions output relative to most homes, or predetermined criteria of other similar homes. A rate of emission is also provided for a user to be conscious of his or her carbon footprint.

A view pane 506 is generated to show a particular setting (e.g., temperature) and data that illustrates an impact of a change of the setting relative to some function, such as cost, energy consumption, cost, emissions, safety, etc. For example, the feedback can include at least one of cost and energy consumption change feedback in response to the adjustment of the at least one setting. For example, the command analysis component 202 can generate an analysis of a received setting or user commands with respect to a change from one operational setting (e.g., temperature or the like) to another operational setting of the set of energy consuming devices 102, 104, and 106. The comparison data is then presented via the user interface component 112 in the view pane 506, such as cost changes, energy consumption changes, or emissions changes as a result of a change of operational setting. The view pane 506 can provide comparison data in different colors depending upon the kind of feedback. For example a red color can indicate that the change is detrimental or that a pre-defined condition has not been met or in green to indicate that the change is beneficial or that a pre-defined condition has been met. Similarly, other indications could be provided in relation to the color of the data in the view pane 506.

Another view 508, provides a comparison of energy consumption with those of other homes or with other home data that can be based on similar homes having similar predetermined criteria as the user's home of the set of energy devices 102, 104, and 106 via the comparison component 208. Home data is aggregated or received from the set of energy consuming devices 102, 104, and 106 of a home, and a comparison can be generated for display.

Figure 6:
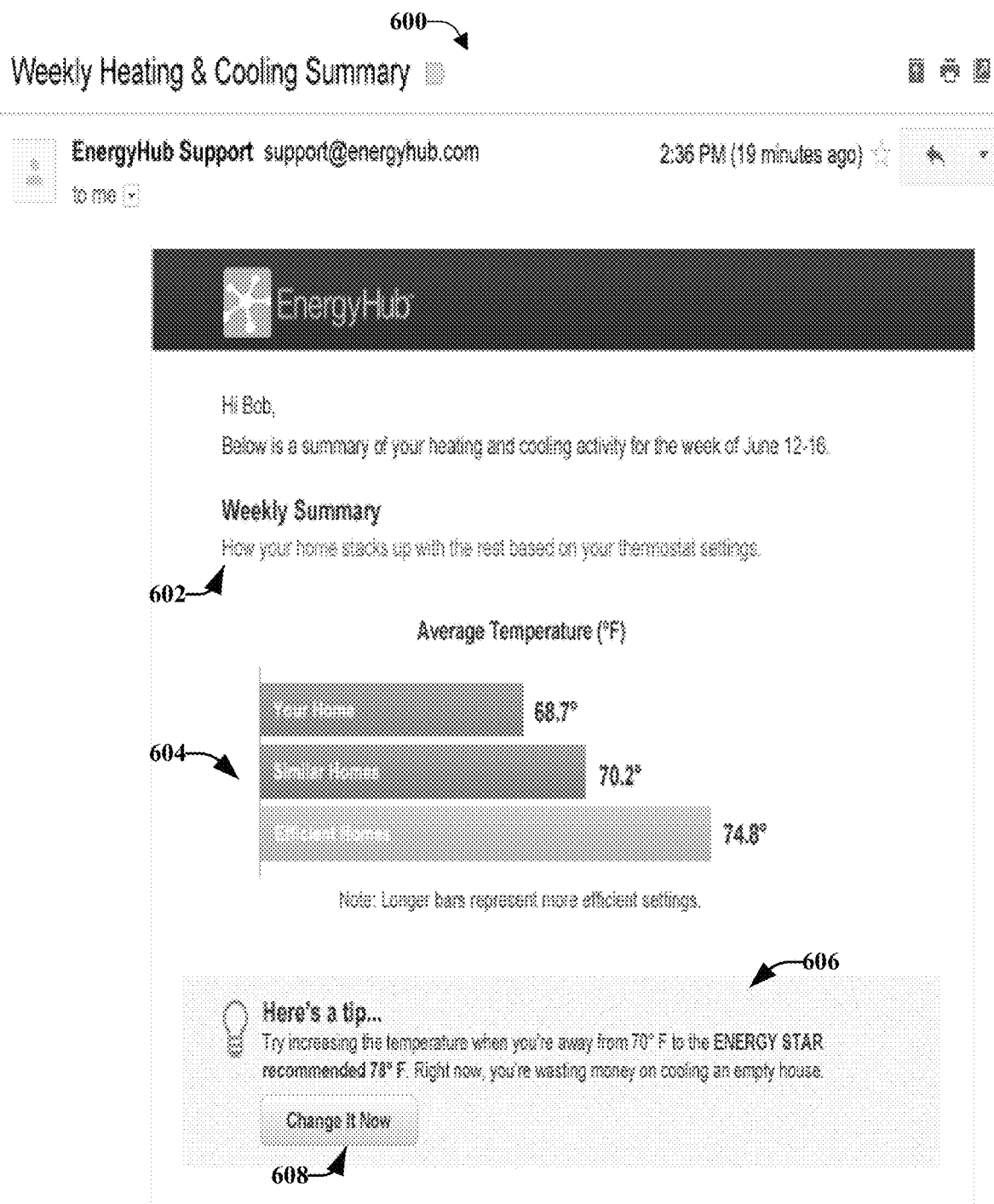
FIG. 6 illustrates an exemplary electronic message in accordance with various embodiments described.

Referring now to FIG. 6, illustrated is exemplary electronic message 600 in accordance with various aspects discussed herein. Data related to the adjusting of the at least one setting can be provide that includes an energy profile 604 of the set of energy consuming devices 102, 104, and 106 as part of home data 602. The energy profile 604 can include cost data for energy consumption of the devices, $CO_2$ data, runtime data, on-site power consumption data of the set of energy consuming devices, on-site power generation data, and on-site storage data of energy, related to the set of energy consuming devices of the home.

The electronic message 600 can be generated with the energy profile 604 of the set of energy consuming devices, recommendations 606 (e.g., cost saving recommendations, thermostat setting recommendations, or other setting recommendations/tips), the $CO_2$ data, the runtime data, the on-site power consumption data, the on-site power generation data, on-site storage data (e.g., battery, capacitor or another energy storage device) for the set of energy consuming devices, as well as with a comparison of home data with home data of other similarly related homes according to a set of predetermined criteria (e.g., geographic proximity, similar construction, size, etc.).

In one embodiment, the home data can be presented with the energy profile, the recommendations 606, the $CO_2$ data, the runtime data, the on-site power consumption data, the on-site power generation data, the comparison, the on-site storage data in a consumer application of a mobile phone or a personal computer via a web browser, for example. In addition, the electronic message can include whether and which one of the set of user commands adjusting the settings for the energy consuming devices meets the pre-defined condition.

In one embodiment, the recommendation or tip 606 includes an input command control 608 with the electronic message that enables an input to be received that activates a recommendation associated with the set of energy consuming devices. The recommendation or tip 606 can be associated with any recommendation or tip for the home in general, and/or for the settings of any of the set of energy consuming devices, for example. The input command control 608 thus operates to activate or implement the recommendation related to the energy consuming devices of the home or building structure via the message 600, such as with a "change it now" button or other graphical user interface control including touch controls, motions controls and other similar user controls.

Figure 7:
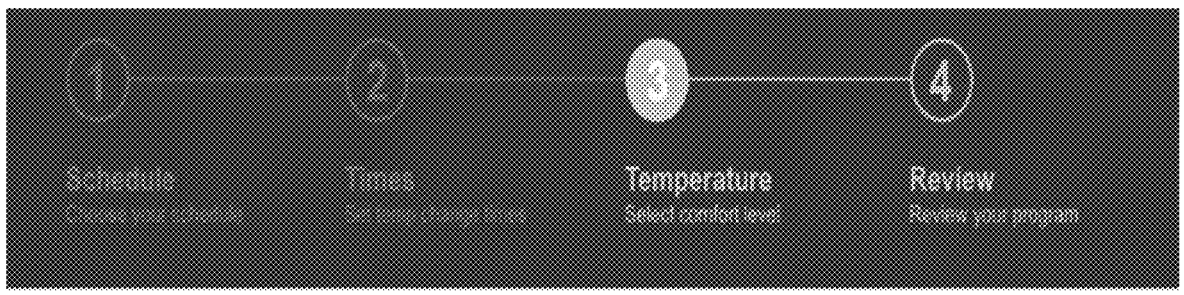
FIG. 7 illustrates an exemplary selection of schedules in accordance with various embodiments described.
Figure 7:
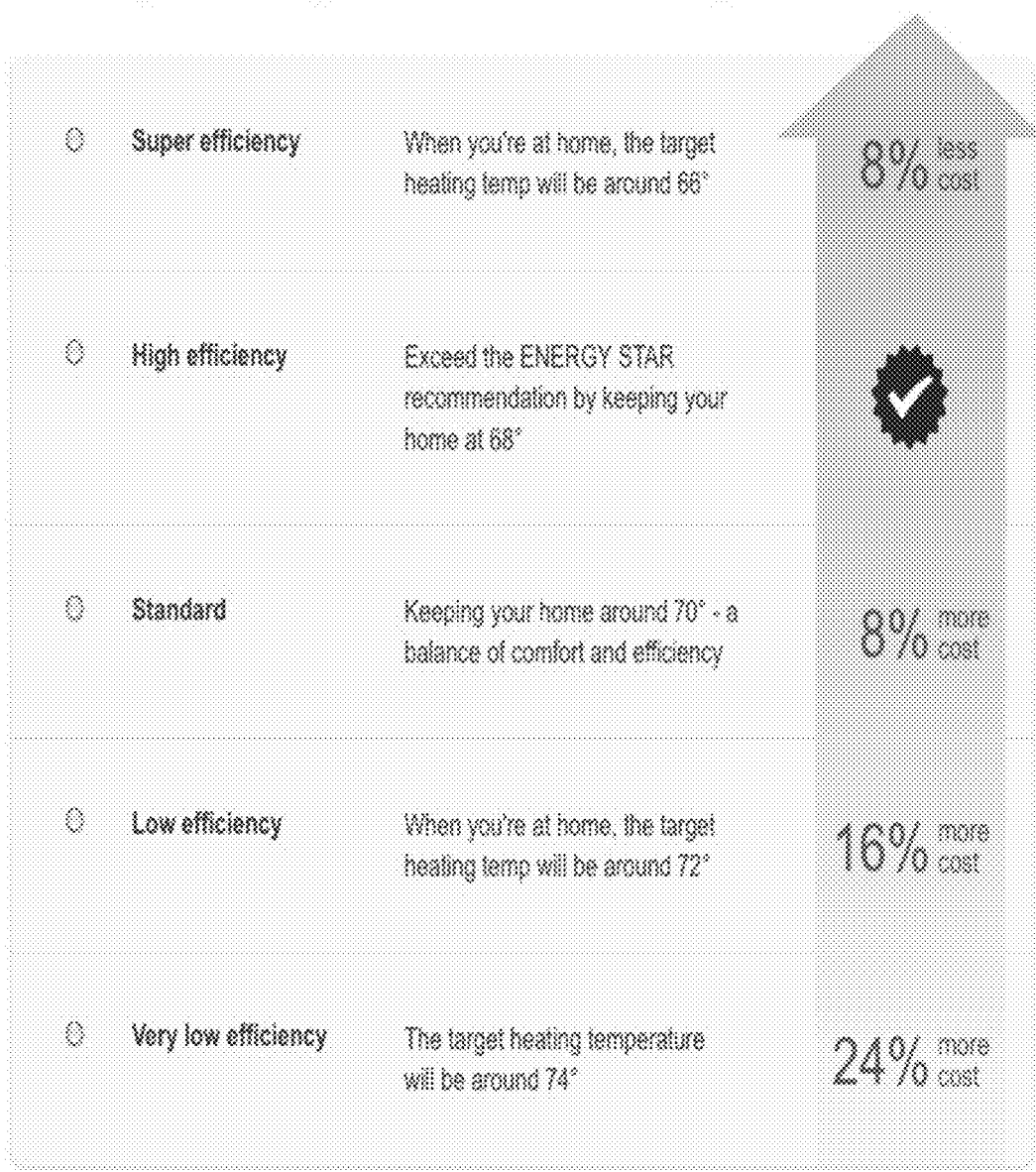

FIG. 7 illustrates an example of schedules that can be based on user preferences for a set of energy consuming devices, such as an HVAC unit, but is not limited as such to any one particular energy consuming device. For example, various efficiency levels or options can be selected in order to define a user preference for comfort, including energy savings, costs, time and/or date. Alongside, the various schedules (e.g., pre-defined programmed settings) is presented information related to cost and home data to make informed decision for setting the set of energy consuming devices of a particular home based on the home's criteria and the various device efficiencies. For example, a change, percentage or some indication related to more or less cost, consumption, emissions, and other energy consumption related characteristics can be provided alongside, proximate to, or otherwise corresponding with the various levels or options.

While the methods described within this disclosure are illustrated in and described herein as a series of acts or events, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 8:
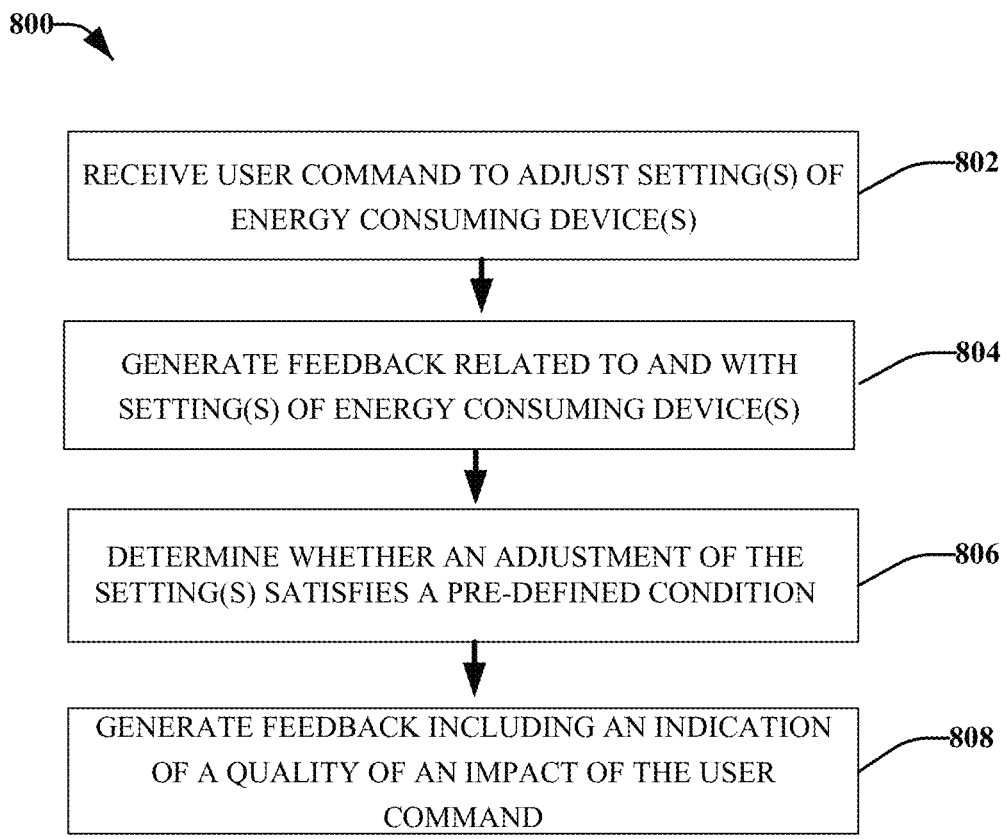
FIG. 8 illustrates a method of generating feedback for a control system in accordance with various aspects described herein.

An example methodology 800 for implementing a method for a control system of a set of energy consuming devices of a powered entity (e.g., a home) is illustrated in FIG. 8. Reference is made to the figures described above for ease of description. However, the methods described herein are not limited to any particular embodiment or example provided within this disclosure.

The method 800 initiates at 802 with receiving a set of user commands that adjust a set of settings of a set of energy consuming devices by a device including at least one processor. The settings can include various different settings to operate various energy consuming devices that are in communication with the processor. For example, temperature settings for at home, time away, returning home, nighttime, a date, vacation time, cost controls, emission controls (e.g., $CO_2$), on-site storage, on-site power generation (e.g., solar panel, windmill device, and the like). Settings can correspond to different categories and positive characteristics of the systems discussed herein, such as operational parameters, cost benefit, and peak demand avoidance, for example.

At 804, feedback is generated that is related to the set of settings of the set of energy consuming devices of a home. The feedback can be related to the adjusted settings or a setting already displayed, in which a display also displays the set of settings in addition to the feedback.

At 806, whether an adjustment of the settings satisfies a pre-defined condition (e.g., a negative and/or positive condition) is determined. At 808, feedback including an indication of a quality of an impact of the set of user commands determined is generated based on the pre-defined condition having been satisfied. The feedback can then be rendered by user interface component, such as in a control screen, view pane, and/or a display on a controller or at a personal device, a client device, and/or through a web browser of or consumer application on a mobile device.

In one embodiment, the method 800 further comprises presenting the feedback proximate to the at least one setting rendered via the user interface component. For example, a positive image can be presented in response to a first pre-defined condition of the pre-defined condition being satisfied. In addition or alternatively, a negative image can be presented in response to a second pre-defined condition of the pre-defined condition being satisfied. The first condition includes a first performance metric related to energy consumption of the set of energy consuming devices being met or exceeded, and the second condition includes a second performance metric related to energy consumption of the set of energy consuming devices being satisfied. For example, the first performance metric includes at least one of cost of energy for the set of energy consuming devices, amount of energy consumed by the set of energy consuming devices, and an amount of carbon dioxide produced by the set of energy consuming devices.

In another embodiment, the method 800 includes displaying, in a user interface via a user interface component, at least one setting, the feedback and data related to the adjusting of the at least one setting resulting from the set of user commands. The feedback includes an image that is associated with and based on the at least one setting related to the set of energy consuming devices. The data can be related to the adjusting of the at least one setting includes a comparison of home data of the set of energy consuming devices of a home with home data of other homes meeting a set of predetermined criteria that includes at least home construction criteria, appliance criteria, weather criteria, geographical criteria that are within a criteria range of the home having the set of energy consuming devices. The data related to the adjusting of the at least one setting can include an energy profile of the set of energy consuming devices that includes cost data, $CO_2$ data, on-site power consumption data of the set of energy consuming devices, on-site power generation data, and/or on-site storage data of energy.

In another embodiment, the method includes 800 adjusting the at least one setting based on a set of predetermined operational programmed settings that meet the pre-defined condition in response to an optimization command being received, such as via the optimization component 204.

The method 800 can further include generating an electronic message with the at least one of the energy profile of the set of energy consuming devices, recommendations, the $CO_2$ data, the on-site power consumption data, the on-site power generation data, and the on-site storage data for the set of energy consuming devices, and presenting the at least one of the energy profile, the cost saving recommendations, the $CO_2$ data, the on-site power consumption data, the on-site power generation data, and the on-site storage data in a consumer application of a mobile phone or a personal computer. The electronic message includes whether the set of user commands adjusting the at least one setting meets, or in other words, satisfies the pre-defined condition and any recommendations related to the energy consuming devices of the home.

In one embodiment, the recommendation or tip generated with the electronic message and communicated to a client device (e.g., a mobile phone, computer and the like) includes an input command control with the electronic message that enables an input to be received that activates a recommendation associated with the set of energy consuming devices. The recommendation can be associated with any recommendation or tip for the home related to the set of energy consuming devices, in general, and/or for the settings of any of the set of energy consuming devices, for example. The input command control thus operates to activate or implement the recommendation related to the energy consuming devices of the home or building structure via the message, such as with a "change it now" button or other graphical user interface control including touch controls, motions controls and the other similar user controls.

As discussed herein, a homeowner (e.g., a user or a consumer) can be provided with positive feedback as well as negative feedback in the case of settings that would lead to high energy usage, high cost, or other undesirable outcomes. Similarly, the consumer could be provided with the estimated costs or energy consumption for running a particular program schedule or for making a temporary or permanent settings change, such as a heating or cooling temperature setpoint or setting.

These types of real-time contextual feedback can be also be delivered in a delayed or batch format, such as with an electronic message to give the consumer more information about his/her energy consumption and help the consumer make the choices that are the appropriate balance of energy savings, costs, comfort, and other relevant evaluation parameters for the consumer. The consumer can also be provided with the energy management settings, costs, or consumption information from other consumers (or other consumers with similar demographic, geographic, etc. characteristics) in order to provide a normative comparison by which the consumer could better evaluate his/her settings. As discussed herein, the consumer can also be provided with user interface elements (e.g., an "Optimize" button) that automatically adjust the consumer's settings to appropriately balance energy savings, costs, comfort, and other relevant evaluation parameters for the consumer.

Exemplary Networked and Distributed Environments

One of ordinary skill in the art can appreciate that the various embodiments for accessing, searching for, retrieval, modification of documents according to the various embodiments of an efficient document management system described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 9:
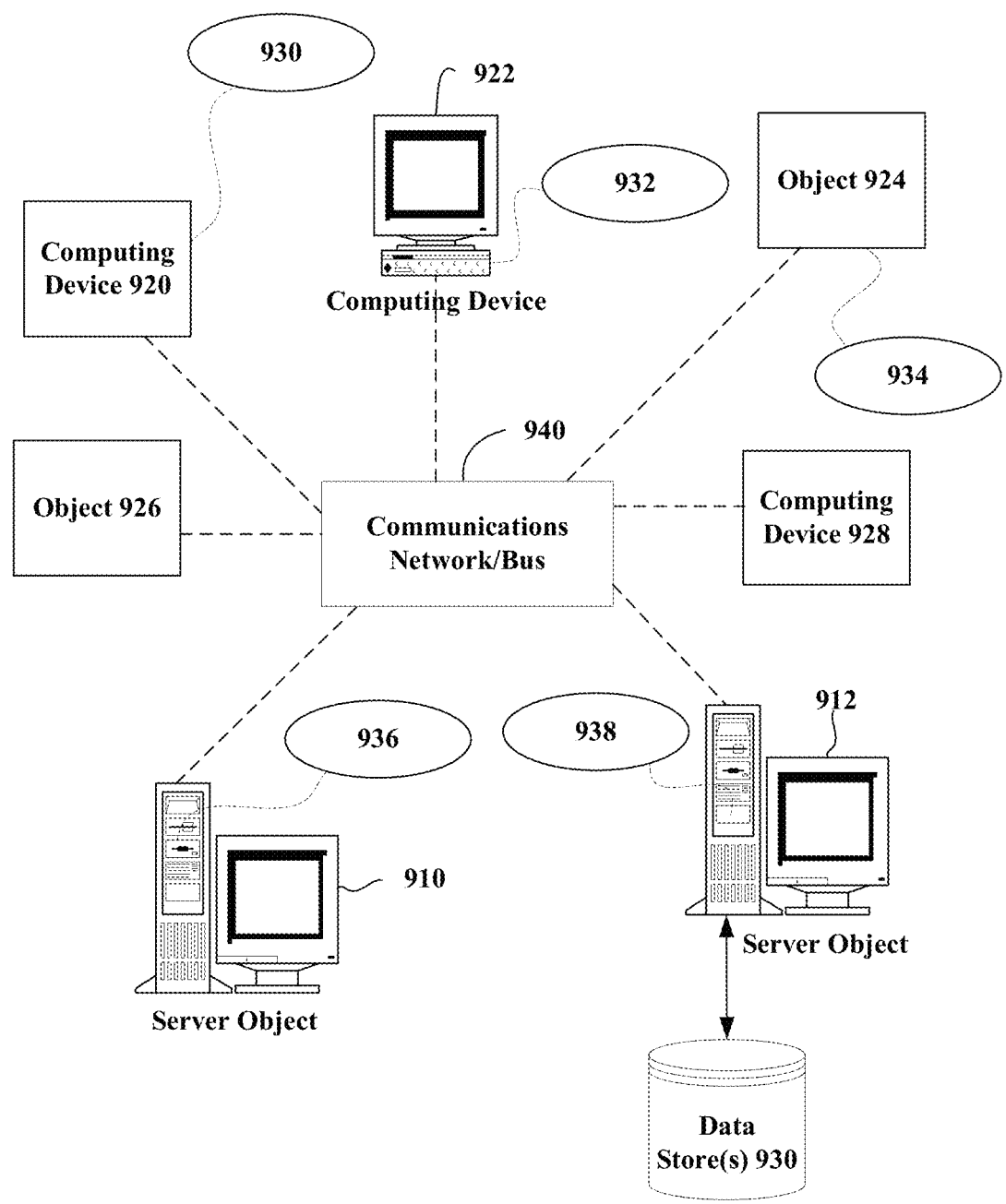
FIG. 9 is a block diagram representing exemplary non-limiting networked environments in which various embodiments described herein can be implemented.

FIG. 9 provides a non-limiting schematic diagram of an exemplary networked or distributed computing environment. The distributed computing environment comprises computing objects or devices 910, 912, etc. and computing objects or devices 920, 922, 924, 926, 928, etc., which may include programs, methods, data stores, programmable logic, etc., as represented by applications 930, 932, 934, 936, 938. It can be appreciated that computing objects or devices 910, 912, etc. and computing objects or devices 920, 922, 924, 926, 928, etc. may comprise different devices, such as PDAs, audio/video devices, mobile phones, MP3 players, laptops, etc., as well as various software and/or hardware objects supported by a given device.

Computing objects or devices 910, 912, etc. and computing objects or devices 920, 922, 924, 926, 928, etc. can communicate with one or more other computing objects or devices 910, 912, etc. and computing objects or devices 920,

922, 924, 926, 928, etc. by way of the communications network 940, either directly or indirectly. Even though illustrated as a single element in FIG. 9, network 940 may comprise other computing objects and computing devices that provide services to an embodiment of the system of FIG. 9, and/or may represent multiple interconnected networks, which are not shown. The computing objects or devices 910, 912, etc. or 920, 922, 924, 926, 928, etc. can also contain an application, such as applications 930, 932, 934, 936, 938, that might make use of an application programming interface (API), or other object, software, firmware and/or hardware, suitable for communication with or implementation of document management systems as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as cloud technologies, software as a service, client/server, peer-to-peer, or hybrid architectures, can be utilized. In a client/server architecture, particularly a networked system, a client usually refers to a computer that accesses network resources or services provided by another computer, e.g., a server. In the illustration of FIG. 9, as a non-limiting example, computing objects or devices 920, 922, 924, 926, 928, etc. can be thought of as clients and computing objects or devices 910, 912, etc. can be thought of as servers where computing objects or devices 910, 912, etc. provide data services, such as receiving data from computing objects or devices 920, 922, 924, 926, 928, etc., storing of data, processing of data, transmitting data to computing objects or devices 920, 922, 924, 926, 928, etc., although any computer can be considered a client, a server, or both, depending on the circumstances. In a peer to peer architecture, typically computing objects or devices 920, 922, 924, 926, 928, etc. and computing objects or devices 910, 912, etc. interact with one another without classification as servers or clients, since at any given moment, the roles of a given node may change depending on the current functions of the node. Any of these computing devices may be processing data, or requesting services or tasks that may implicate one or more aspects of document management and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to document management can be provided standalone, or distributed across multiple computing devices or objects.

In a network environment in which the communications network/bus 940 is the Internet, for example, the computing objects or devices 910, 912, etc. can be Web servers with which the computing objects or devices 920, 922, 924, 926, 928, etc. communicate via any of a number of known protocols, such as HTTP. As mentioned, computing objects or devices 910, 912, etc. may also serve as computing objects or devices 920, 922, 924, 926, 928, etc., or vice versa, as may be characteristic of a distributed computing environment.

Exemplary Computing Device

As mentioned, various embodiments described herein apply to any device wherein it may be desirable to manage documents, e.g., as they are modified and proliferate for groups of users. It is understood, therefore, that handheld, portable and other computing devices and computing objects of all kinds are contemplated for use in connection with the various embodiments described herein, i.e., anywhere that a device may provide some functionality in connection with implementing management of documents. Accordingly, the below general purpose remote computer described below in FIG. 10 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer-executable instructions, such as program modules, being executed by one or more computers, such as client workstations, servers or other devices. Those skilled in the art will appreciate that network interactions may be practiced with a variety of computer system configurations and protocols.

Figure 10:
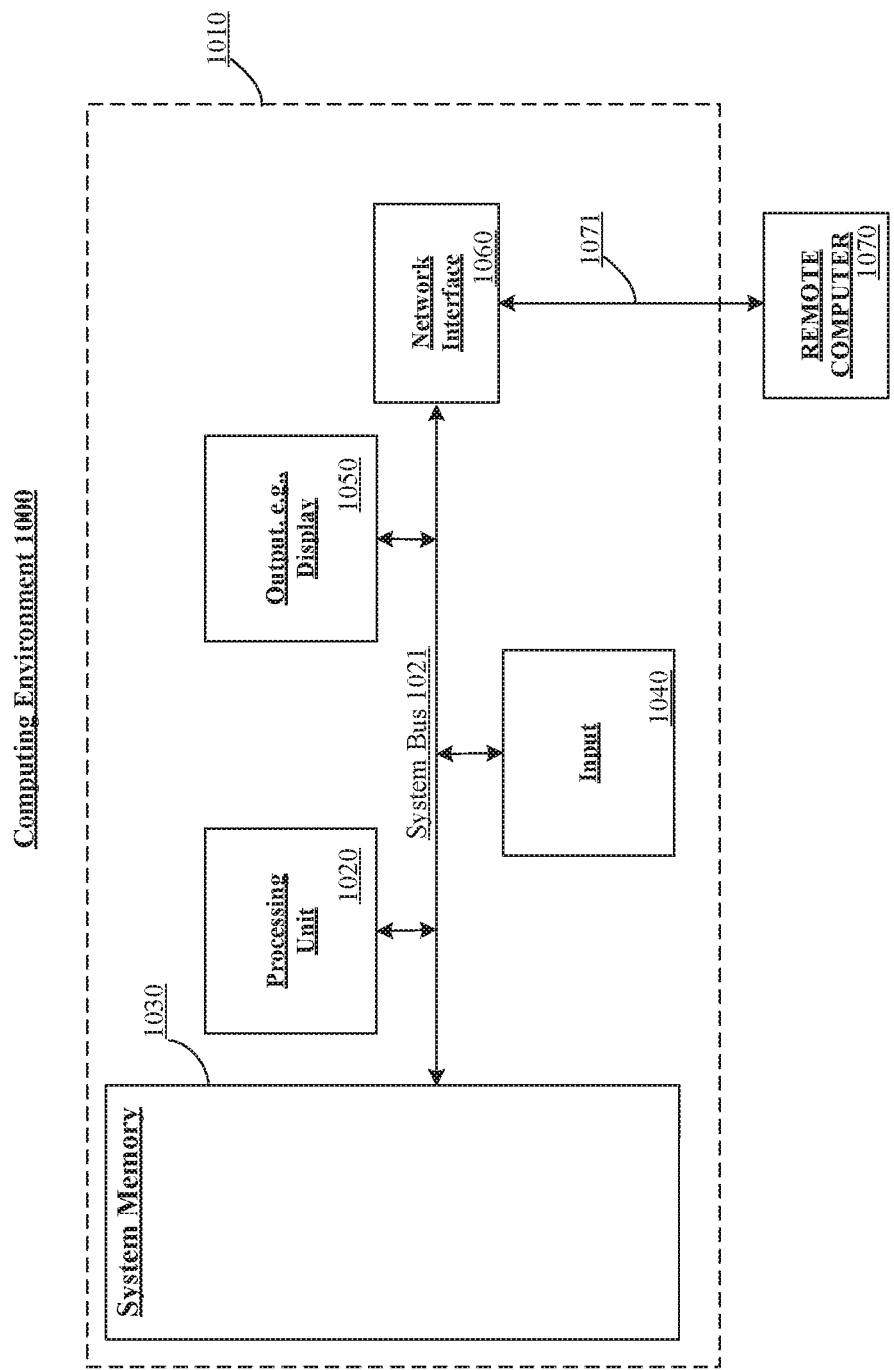
FIG. 10 is a block diagram representing an exemplary non-limiting computing system or operating environment in which one or more aspects of various embodiments described herein can be implemented.

FIG. 10 thus illustrates an example of a suitable computing system environment 1000 in which one or more of the embodiments may be implemented, although as made clear above, the computing system environment 1000 is only one example of a suitable computing environment and is not intended to suggest any limitation as to the scope of use or functionality of any of the embodiments. The computing environment 1000 is not to be interpreted as having any dependency or requirement relating to any one or combination of components illustrated in the exemplary computing environment 1000.

With reference to FIG. 10, an exemplary remote device for implementing one or more embodiments herein can include a general purpose computing device in the form of a handheld computer 1010. Components of handheld computer 1010 may include, but are not limited to, a processing unit 1020, a system memory 1030, and a system bus 1021 that couples various system components including the system memory to the processing unit 1020.

Computer 1010 typically includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, memory 1030 may also include an operating system, application programs, other program modules, and program data. In this regard, computer readable storage media can be any available media that can be accessed by the computer including removable and non-removable media. By way of example, and not limitation, computer-readable media can comprise computer readable storage media and/or communication media. Computer readable storage media can include volatile and nonvolatile, removable and non-removable media implemented in any method or technology for storage of information such as computer-readable instructions, data structures, program modules or other data. Computer readable storage media includes, but is not limited to, RAM, ROM, Electrically Erasable Programmable Read-Only Memory (EEPROM), flash memory, universal serial bus (USB) drives, or other memory technology, compact disk (CD), digital versatile disk (DVD) or other optical disk storage, magnetic cassettes, magnetic tape, magnetic disk storage, or other magnetic storage devices, or any other medium which can be used to store information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

In one embodiment, a computer readable storage medium comprises computer executable instructions that, in response to execution, cause a computing system, such as computer 1010 including at least one processor 1020 to perform operations. The operations comprise receiving a set of user commands to adjust at least one setting of a set of energy consuming devices of a home, determining whether an adjustment of the at least one setting satisfies a pre-defined condition, and generating feedback. The feedback, for example, includes an indication of a quality of an impact of the set of user commands determined based on the pre-defined condition having been satisfied, for render by a user interface.

For example, the pre-defined condition can comprise at least one setting meeting or exceeding a recommended operational setting for the set of energy consuming devices. Additionally, the pre-defined condition is based on an energy consuming function that determines at least one of a cost of energy consumption, an amount of energy consumption, a runtime, and/or an amount of $CO_2$ generation, of the set of energy consuming devices.

The operations of the computer readable storage medium further comprise presenting a positive image (e.g., a checkmark, green item, or other image alongside a setting reading) in response to a first condition of the pre-defined condition being satisfied. Additionally or alternatively, the operations include presenting a negative image (e.g., a dollar sign, an X, and other image) in response to a second condition of the pre-defined condition being satisfied. Other feedback is also envisioned, such as sound, animation, haptic feedback, video, etc.

The operations can further comprise displaying, in a user interface component via the user interface, the at least one setting, the feedback and data related to the adjusting of the at least one setting resulting from the set of user commands, wherein the feedback includes an image that is associated with and based on the at least one setting related to the set of energy consuming devices. The operations can further include adjusting the at least one setting based on a set of predetermined operational programmed settings that satisfy the pre-defined condition in response to an optimization command being received. For example, the optimization command is a single command or single user input.

Additionally, the predetermined operational programmed settings can include set schedules of settings or one or more predetermined operations programmed settings stored as a group. For example, at least one predetermined schedule of the set of predetermined operational programmed settings includes multiple settings at different times for at least one energy consuming device of the set of energy consuming devices.

The operations further can include generating an electronic message with at least one of an energy profile of the set of energy consuming devices, recommendations, and $CO_2$ data. The message can also include a comparison of the set of energy consuming devices of a home with other homes or other energy consuming devices of other homes, such as home with similar criteria (e.g., construction design, size, number of rooms, geographical region, etc.). In another embodiment, the electronic message (e.g., email, or the like) can include a user option to implement a recommendation, such as to set a thermostat to a certain level or setting. Thus, the user can responds to set their settings based on the recommendation with a single user input or user command.

A user may enter commands and information into the computer 1010 through input devices 1040. A monitor or other type of display device is also connected to the system bus 1021 via an interface, such as output interface 1050. In addition to a monitor, computers may also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1071, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and memory architectures, the underlying concepts may be applied to any network system and any computing device or storage system in which it is desirable to manage documents.

In other embodiments, a system, as disclosed herein, can comprise means for generating a user interface that provides a feedback image and an operational setting for a set of energy consuming devices. The system can include means for generating a determination based on whether a condition of a predetermined function is met as a function of the operational setting. For example, the means for generating the user interface generates the feedback image based on the determination. In another example, the means for determining performs the determination based in part on a set of user commands being received by the means for generating the user interface.

The system can further comprise means for optimizing settings for the set of energy consuming devices based on a set of predetermined operational programmed settings that meet the condition of the predetermined function, and means for comparing home data of the set of energy consuming devices of a home with home data of other homes meeting a set of predetermined criteria to generate a comparison and display the comparison via the means for generating the user interface. The system can further comprise means for communicating an electronic message to a user email, a mobile phone, or personal device with at least one of an energy profile, cost saving recommendations, a comparison of home data of the set of energy consuming devices of a home with home data of other homes meeting a set of predetermined criteria and $CO_2$ data, related to the set of energy consuming devices.

There are multiple ways of implementing one or more of the embodiments described herein, e.g., an appropriate API, tool kit, driver code, operating system, control, standalone or downloadable software object, executable code, etc. which enables applications and services to use or access the various document management embodiments from any platform. Embodiments may be contemplated from the standpoint of an API (or other software object), as well as from a software or hardware object that facilitates provision of document management in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter can be appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While in some embodiments, a client side perspective is illustrated, it is to be understood for the avoidance of doubt that a corresponding server perspective exists, or vice versa. Similarly, where a method is practiced, a corresponding device can be provided having storage and at least one processor configured to practice that method via one or more components.

While the various embodiments have been described in connection with the preferred embodiments of the various figures, it is to be understood that other similar embodiments may be used or modifications and additions may be made to the described embodiment for performing the same function without deviating there from. Still further, one or more aspects of the above described embodiments may be implemented in or across a plurality of processing chips or devices, and storage may similarly be affected across a plurality of devices. Therefore, the various embodiments should not be limited to any single embodiment, but rather should be construed in breadth and scope in accordance with the appended claims.

The invention claimed is:

1. An apparatus comprising:
   a memory storing computer-executable instructions;
   a processor, communicatively coupled to the memory, that facilitates execution of the computer-executable instructions to perform operations comprising:
     accessing property data associated with an individual property among multiple monitored properties;
     accessing utility data associated with the individual property among the multiple monitored properties;
     determining an energy profile of the individual property based on the accessed property data and the accessed utility data;
     compiling the energy profile of the individual property into an aggregate property database for the multiple monitored properties;
     using the aggregate property database to compare the energy profile of the individual property to energy profiles of other similar type properties;
     presenting, to a user, results of the comparison of the energy profile of the individual property to the energy profiles of other similar type properties;
     presenting, to the user, an interface for control of an energy consuming device located at the individual property by:
       presenting, within the interface, a set of categories related to control of the energy consuming device, presenting, within the interface, a set of settings of the energy consuming device corresponding to the set of categories, determining that a first setting in the set of settings satisfies a first condition related to an energy recommendation, determining that a second setting in the set of settings satisfies a second condition as being a detriment or a discouraged setting, the second setting being different from the first setting, the second condition being different from the first condition, and the second condition being related to safety, and presenting, within the interface, feedback images for at least two of the set of settings of the energy consuming device, the feedback images including a positive image for the first setting based on the determination that the first setting satisfies the first condition related to an energy recommendation and a negative image for the second setting based on the determination that the second setting satisfies the second condition as being a detriment or a discouraged setting;

receiving, through the interface, user input for controlling the energy consuming device located at the individual property; and controlling the energy consuming device located at the individual property based on the user input received through the interface.

2. The apparatus of claim 1, wherein accessing property data associated with an individual property among multiple monitored properties comprises accessing physical and demographic data about the individual property among the multiple monitored properties.

3. The apparatus of claim 2, wherein accessing physical and demographic data about the individual property among the multiple monitored properties comprises accessing a geographical location, a size, a number of floors or rooms, an age of construction, and an orientation of the individual property.

4. The apparatus of claim 1, wherein accessing property data associated with an individual property among multiple monitored properties comprises accessing meteorological data associated with a location of the individual property including local temperatures and precipitation.

5. The apparatus of claim 1, wherein accessing utility data associated with the individual property among the multiple monitored properties comprises accessing historical energy consumption and cost history information associated with the individual property among the multiple monitored properties.

6. The apparatus of claim 1, wherein accessing utility data associated with the individual property among the multiple monitored properties comprises accessing emissions of carbon dioxide by a utility generation mix or other emission data associated with the individual property among the multiple monitored properties.

7. The apparatus of claim 1, wherein the operations further comprise:

determining at least one recommendation for the individual property based on the results of the comparison of the energy profile of the individual property to the energy profiles of other similar type properties; and presenting, to the user, the at least one recommendation for the individual property.

8. The apparatus of claim 7, wherein determining at least one recommendation for the individual property based on the results of the comparison of the energy profile of the individual property to the energy profiles of other similar type properties comprises determining at least one recommendation regarding energy reduction for the individual property and/or addition of on-site power generation or storage at the individual property.

9. The apparatus of claim 7, wherein determining at least one recommendation for the individual property based on the results of the comparison of the energy profile of the individual property to the energy profiles of other similar type properties comprises determining at least one recommendation based on at least one of comparison of similar type properties, age of the individual property, geographical location of the individual property, cost of the individual property, home construction efficiency of the individual property, resident demographic data of the individual property, past utility billing information of the individual property, total energy consumption of the individual property, and energy consumption of individual energy consuming devices at the individual property.

10. The apparatus of claim 1, wherein presenting, to the user, results of the comparison of the energy profile of the individual property to the energy profiles of other similar type properties comprises presenting, to the user, how the individual property compares to similar properties and how the individual property compares to efficient properties.

11. A method comprising:

accessing property data associated with an individual property among multiple monitored properties;

accessing utility data associated with the individual property among the multiple monitored properties;

determining an energy profile of the individual property based on the accessed property data and the accessed utility data;

compiling the energy profile of the individual property into an aggregate property database for the multiple monitored properties;

using the aggregate property database to compare the energy profile of the individual property to energy profiles of other similar type properties; and presenting, to a user, results of the comparison of the energy profile of the individual property to the energy profiles of other similar type properties;

presenting, to the user, an interface for control of an energy consuming device located at the individual property by:

presenting, within the interface, a set of categories related to control of the energy consuming device, presenting, within the interface, a set of settings of the energy consuming device corresponding to the set of categories, determining that a first setting in the set of settings satisfies a first condition related to an energy recommendation, determining that a second setting in the set of settings satisfies a second condition as being a detriment or a discouraged setting, the second setting being different from the first setting, the second condition being different from the first condition, and the second condition being related to safety, and presenting, within the interface, feedback images for at least two of the set of settings of the energy consuming device, the feedback images including a positive image for the first setting based on the determination that the first setting satisfies the first condition related to an energy recommendation and a negative image for the second setting based on the determination that the second setting satisfies the second condition as being a detriment or a discouraged setting;

receiving, through the interface, user input for controlling the energy consuming device located at the individual property; and controlling the energy consuming device located at the individual property based on the user input received through the interface.

12. The method of claim 11, wherein accessing property data associated with an individual property among multiple monitored properties comprises accessing physical and demographic data about the individual property among the multiple monitored properties.

13. The method of claim 12, wherein accessing physical and demographic data about the individual property among the multiple monitored properties comprises accessing a geographical location, a size, a number of floors or rooms, an age of construction, and an orientation of the individual property.

14. The method of claim 11, wherein accessing property data associated with an individual property among multiple monitored properties comprises accessing meteorological data associated with a location of the individual property including local temperatures and precipitation.

15. The method of claim 11, wherein accessing utility data associated with the individual property among the multiple monitored properties comprises accessing historical energy consumption and cost history information associated with the individual property among the multiple monitored properties.

16. The method of claim 11, wherein accessing utility data associated with the individual property among the multiple monitored properties comprises accessing emissions of carbon dioxide by a utility generation mix or other emission data associated with the individual property among the multiple monitored properties.

17. The method of claim 11, further comprising:

determining at least one recommendation for the individual property based on the results of the comparison of the energy profile of the individual property to the energy profiles of other similar type properties; and presenting, to the user, the at least one recommendation for the individual property.

18. The method of claim 17, wherein determining at least one recommendation for the individual property based on the results of the comparison of the energy profile of the individual property to the energy profiles of other similar type properties comprises determining at least one recommendation regarding energy reduction for the individual property and/or addition of on-site power generation or storage at the individual property.

19. The method of claim 17, wherein determining at least one recommendation for the individual property based on the results of the comparison of the energy profile of the individual property to the energy profiles of other similar type properties comprises determining at least one recommendation based on at least one of comparison of similar type properties, age of the individual property, geographical location of the individual property, cost of the individual property, home construction efficiency of the individual property, resident demographic data of the individual property, past utility billing information of the individual property, total energy consumption of the individual property, and energy consumption of individual energy consuming devices at the individual property.

20. The method of claim 11, wherein presenting, to the user, results of the comparison of the energy profile of the individual property to the energy profiles of other similar type properties comprises presenting, to the user, how the individual property compares to similar properties and how the individual property compares to efficient properties.

* * * * *